(12) United States Patent
Kurokawa

(10) Patent No.: US 10,099,718 B2
(45) Date of Patent: Oct. 16, 2018

(54) ELECTRIC POWER STEERING DEVICE AND METHOD FOR ASSEMBLING THE SAME

(71) Applicant: NSK LTD., Tokyo (JP)

(72) Inventor: Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 71 days.

(21) Appl. No.: 15/102,603

(22) PCT Filed: Jan. 9, 2015

(86) PCT No.: PCT/JP2015/050529
§ 371 (c)(1),
(2) Date: Jun. 8, 2016

(87) PCT Pub. No.: WO2015/133167
PCT Pub. Date: Sep. 11, 2015

(65) Prior Publication Data
US 2017/0253264 A1    Sep. 7, 2017

(30) Foreign Application Priority Data

Mar. 5, 2014 (JP) ................................. 2014-043250
Jul. 18, 2014 (JP) ................................. 2014-148079
(Continued)

(51) Int. Cl.
*B62D 5/04* (2006.01)
*F16D 3/12* (2006.01)
*F16H 1/16* (2006.01)

(52) U.S. Cl.
CPC ............ *B62D 5/0409* (2013.01); *F16D 3/12* (2013.01); *F16H 1/16* (2013.01)

(58) Field of Classification Search
CPC ............ B62D 5/0409; F16H 1/16; F16H 3/12
(Continued)

(56) References Cited

U.S. PATENT DOCUMENTS 6,360,841 B1    3/2002    Blandino et al.
2004/0084865 A1    5/2004    Kitami et al.
(Continued)

FOREIGN PATENT DOCUMENTS

DE    102011054983 A1    5/2013
EP    1327569 A2    7/2003
(Continued)

OTHER PUBLICATIONS

International Search Report dated Apr. 7, 2015 issued by International Searching Authority in counterpart International Patent Application No. PCT/JP2015/050529 (PCT/ISA/210).
(Continued)

*Primary Examiner* — Joseph M Rocca
*Assistant Examiner* — Felicia L. Brittman
(74) *Attorney, Agent, or Firm* — Sughrue Mion, PLLC

(57) ABSTRACT

An axially intermediate portion of a spring shaft portion 36 of a torsion bar 14a is provided with a large diameter portion 37, and an outer peripheral surface of the large diameter portion 37 is in contact with or is positioned close to an inner peripheral surface of a hollow output shaft 13a. Accordingly, in an electric power steering device, when one of a pair of coupling shaft portions, which are axially end portions of the torsion bar, to be coupled to a coupling hole of a counter-shaft later is press-fitted into the coupling hole of the counter-shaft, the spring shaft portion of the torsion bar can be prevented from buckling.

15 Claims, 20 Drawing Sheets

(30) Foreign Application Priority Data

Aug. 6, 2014 (JP) .................................. 2014-160002
Oct. 6, 2014 (JP) .................................. 2014-205407

(58) Field of Classification Search
USPC ......................................................... 180/444
See application file for complete search history.

(56) References Cited

U.S. PATENT DOCUMENTS

| | | |
|---|---|---|
| 2010/0147619 A1 | 6/2010 | Chandy et al. |
| 2010/0228441 A1* | 9/2010 | Watanabe ............ B62D 5/0457 |
| | | 701/41 |
| 2012/0117805 A1* | 5/2012 | Sisson .................... B62D 5/083 |
| | | 29/890.124 |
| 2013/0327158 A1 | 12/2013 | Hibi et al. |

FOREIGN PATENT DOCUMENTS

| | | |
|---|---|---|
| EP | 2591982 A1 | 5/2013 |
| JP | 63-122924 A | 5/1988 |
| JP | 4-5530 A | 1/1992 |
| JP | 2003-207029 A | 7/2006 |
| JP | 2007-302066 A | 11/2007 |
| JP | 2010-36678 A | 2/2010 |
| JP | 2010-89709 A | 4/2010 |
| JP | 2010-122096 A | 6/2010 |
| JP | 5338180 B2 | 11/2013 |
| JP | 2013-253880 A | 12/2013 |
| WO | 03/104065 A1 | 12/2003 |
| WO | 2006/048392 A1 | 5/2006 |
| WO | 2007051510 A1 | 5/2007 |

OTHER PUBLICATIONS

Written Opinion dated Apr. 7, 2015 issued by International Searching Authority in counterpart International Patent Application No. PCT/JP2015/050529 (PCT/ISA/237).

Communication dated Jan. 2, 2017, issued by the European Patent Office in counterpart European Application No. 15757676.0.

Communication dated Mar. 29, 2018 issued by the Intellectual Property Office of P.R. China in corresponding Chinese Patent Application No. 201580002898.9.

* cited by examiner

ELECTRIC POWER STEERING DEVICE AND METHOD FOR ASSEMBLING THE SAME

TECHNICAL FIELD

The present invention relates to an electric power steering device configured to reduce a force, which is necessary for a driver to operate a steering wheel, by using an electric motor as a generation source of auxiliary power, and a method for assembling the same.

BACKGROUND ART

As a steering device for applying a steering angle to steered wheels of an automobile, there has been widely known a structure shown in FIG. 21. In the steering device, a steering shaft 3 is rotatably supported to an inner diameter side of a cylindrical steering column 2 supported to a vehicle body 1. A steering wheel 4 is fixed to a rear end portion of the steering shaft 3 protruding from a rear end opening of the steering column 2. When the steering wheel 4 is rotated, the rotation is transmitted to an input shaft 8 of a steering gear unit 7 via the steering shaft 3, a universal joint 5a, an intermediate shaft 6 and a universal joint 5b. When the input shaft 8 is rotated, a pair of tie rods 9, 9 arranged at both sides of the steering gear unit 7 is pushed and pulled, so that a steering angle corresponding to an operation amount of the steering wheel 4 is applied to a pair of left and right steered wheels.

In this specification, a front-rear direction indicates a front-rear direction of a vehicle, unless particularly otherwise mentioned.

The example of FIG. 21 shows an electric power steering device configured to reduce an operating force of the steering wheel 4 by using an electric motor 10 as an auxiliary power source. Therefore, a housing 11 is fixed to a front end portion of the steering column 2, the electric motor 10 is supported to the housing 11 and a plurality of constitutional components are provided in the housing 11.

As shown in FIG. 22, the constitutional components include an input shaft 12 to which a steering force is applied from the steering wheel 4 (FIG. 21), a hollow output shaft 13 to which auxiliary power is applied using the electric motor 10 (FIG. 21) as a generation source, a torsion bar 14 arranged at an inner diameter side of the output shaft 13 and having both end portions coupled to the output shaft 13 and the input shaft 12, respectively, such that torque can be transmitted, a torque detector configured to detect the steering force based on elastic torsional deformation of the torsion bar 14, and the like (for example, refer to Patent Document 1). The input shaft 12 and the output shaft 13 are coupled to each other while a relative rotation is restrained within a predetermined angle range by engaging male and female stopper portions 15, 16 provided at axial end portions thereof with a circumferential gap therebetween.

When assembling the input shaft 12, the output shaft 13 and the torsion bar 14 shown in FIG. 22, a rear end portion (a right end portion in FIG. 22) of the torsion bar 14 is first press-fitted into a coupling hole 17 provided at an inner diameter side of the input shaft 12 to couple the rear end portion of the torsion bar 14 to the input shaft 12 such that torque can be transmitted. Then, the torsion bar 14 is inserted into a center hole 18 of the output shaft 13, and a front end portion (a left end portion in FIG. 22) of the torsion bar 14 is fitted into a coupling hole 19 provided at a front end portion of the center hole 18 without interference. The male and female stopper portions 15, 16 are engaged with a circumferential gap therebetween. Then, at a state where a positional relation between the input shaft 12 and the output shaft 13 in a rotating direction is adjusted to a center position of the predetermined angle range, a diametrical through hole 20 is formed at matching positions of the front end portion of the output shaft 13 and the front end portion of the torsion bar 14 by drilling processing. Then, a pin 21 is press-fitted into the through hole 20 to couple the front end portion of the torsion bar 14 to the output shaft 13 such that torque can be transmitted.

According to the above related-art structure and method for assembling the same, it is necessary to restrain the positional relation between the input shaft 12 and the output shaft 13 in the rotating direction and to form the through hole 20 with keeping the restrained positional relation. For this reason, dedicated jig and equipment are required when forming the through hole 20, which increases the cost.

In view of this situation, when assembling the above related-art structure, if the front end portion of the torsion bar 14 and the output shaft 13 are coupled by the pin 21 and then the rear end portion of the torsion bar 14 is press-fitted into the coupling hole 17 of the input shaft 12, the dedicated jig and equipment are not required when forming the through hole 20, so that it is possible to reduce the cost.

However, in this case, when press-fitting the rear end portion of the torsion bar 14 into the coupling hole 17 of the input shaft 12, a high axial compressive force is applied to a spring shaft portion, which is an axially intermediate portion of the torsion bar 14. For this reason, it is necessary to increase the stiffness of the spring shaft portion so as to prevent the spring shaft portion from buckling due to the high axial compressive force. On the other hand, if the stiffness of the spring shaft portion is increased, the vibration is more likely to be transmitted from the steered wheels to the steering wheel 4 through the spring shaft portion and the detection sensitivity of the steering torque is lowered.

Incidentally, in the above related-art structure, if the coupling structure of the front end portion of the torsion bar 14 and the output shaft 13 is changed into a press-fitting coupling structure, the through hole 20 and the pin 21 are not required, so that the jig and equipment are not necessary. Further, a removing operation (cleaning operation) of chips (iron powders), which are generated when forming the through hole 20, is not required and the number of components can be reduced, so that it is possible to reduce the cost.

In this case, however, since both end portions of the torsion bar 14 are sequentially press-fitted into the two coupling holes 17, 19, if the press-fitting which is performed later is performed such that the first press-fitted end portion is axially pressed towards the end portion to be press-fitted later, a high axial compressive force is applied to the spring shaft portion of the torsion bar 14. Therefore, the problems similar to the above are caused.

Incidentally, Patent Document 2 is another background art document relating to the present invention. Patent Document 2 describes an electric power steering device having a configuration to which the present invention can be applied.

BACKGROUND ART DOCUMENT

Patent Document

Patent Document 1: JP-A-2010-89709
Patent Document 2: WO2003/104065

SUMMARY OF THE INVENTION

Problem to be Solved

The present invention has been made in view of the above-circumstances, and an object is to provide an electric power steering device and a method for assembling the same capable of preventing an axially intermediate portion of a torsion bar from buckling when press-fitting at least one of both axial end portions of the torsion bar into a coupling hole of an input shaft or an output shaft.

Means for Solving the Problem

An electric power steering device of the present invention includes:

a hollow first shaft;

a second shaft which is arranged coaxially with the first shaft; and a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted, wherein at least one of the coupling shaft portions is press-fitted into a coupling hole formed in a counter-shaft which is one of the first and second shafts, to which the one of the coupling shaft portions is to be coupled, and wherein a steering force from a steering wheel is applied to either one of the first and second shafts.

In particular, in the electric power steering device of the present invention, one of an outer peripheral surface of an axially intermediate portion of the spring shaft portion and an inner peripheral surface of an axially intermediate portion of the first shaft is provided with a diametrical extension portion which is configured by any one of the spring shaft portion, the first shaft, and a bush provided on the spring shaft portion or the first shaft, and which extends in a diametrical direction more than portions adjacent to both axial sides thereof. The diametrical extension portion is in contact with or positioned closer to an opposite surface of the other of the outer peripheral surface of the axially intermediate portion of the spring shaft portion and the inner peripheral surface of the axially intermediate portion of the first shaft than the portions adjacent to both axial sides of the diametrical extension portion.

In an embodiment to be described later, the second shaft is arranged coaxially with the first shaft with relative rotation to the first shaft being restrained within a predetermined angle range.

Also, another member (for example, the other one of the first and second shafts or a rack shaft configuring a steering gear unit) provided on a steering force transmission mechanism configured to transmit movement of a steering wheel to steered wheels is applied with auxiliary power of an electric motor as a generation source.

When implementing the electric power steering device of the present invention, preferably, the diametrical extension portion includes a large diameter portion configured by the axially intermediate portion of the spring shaft portion and having a larger outer diameter size than the portions adjacent to both axial sides thereof, and an outer peripheral surface of the large diameter portion is in contact with or positioned closer to an inner peripheral surface of the first shaft than outer peripheral surfaces of portions adjacent to both axial sides of the large diameter portion.

Alternatively, the diametrical extension portion includes a small diameter portion configured by the axially intermediate portion of the first shaft and having a smaller outer diameter size than the portions adjacent to both axial sides thereof, and an inner peripheral surface of the small diameter portion is in contact with or positioned closer to an outer peripheral surface of the spring shaft portion than inner peripheral surfaces of portions adjacent to both axial sides of the small diameter portion.

Alternatively, the diametrical extension portion includes a bush provided on the axially intermediate portion of the spring shaft portion, and an outer peripheral surface of the bush is in contact with or positioned closer to the inner peripheral surface of the first shaft than outer peripheral surfaces of portions adjacent to both axial sides of the bush.

Alternatively, the diametrical extension portion includes a bush provided on the axially intermediate portion of an inner diameter portion of the first shaft, and an inner peripheral surface of the bush is in contact with or positioned closer to an outer peripheral surface of the spring shaft portion than inner peripheral surfaces of portions adjacent to both axial sides of the bush.

More preferably, the large diameter portion or the small diameter portion is provided on a portion including an axially center portion of the spring shaft portion.

Also, when implementing the present invention, the large diameter portion or the small diameter portion may be provided at only one axial position of the spring shaft portion or at a plurality of axial positions of the spring shaft portion.

Also, when implementing the electric power steering device of the present invention, a first stopper portion provided on one axial portion (an axial end portion or the axially intermediate portion) of the first shaft and a second stopper portion provided on one axial portion (an axial end portion or the axially intermediate portion) of the second shaft are preferably engaged with each other with a circumferential gap therebetween such that relative rotations of the first and second shafts are restrained within a predetermined angle range.

Also, the one of the coupling shaft portions is coupled to the first shaft such that torque can be transmitted and axial relative displacement is prevented. Incidentally, in order to implement this coupling manner, a pin is inserted into a diametrical through hole formed at a position where the one of the coupling shaft portions and the first shaft are matched in a state where the one of the coupling shaft portions is fitted in the coupling hole formed in the first shaft, the one of the coupling shaft portions and the first shaft are welded or bonded to each other or engaged portions of the one coupling shaft portion and the first shaft are plastically deformed (crimped), for example.

Also, the other of the coupling shaft portions is press-fitted into a coupling hole formed in the second shaft.

Further, there is a size relation that at assembling, after the torsion bar is arranged at the inner diameter side of the first shaft and the one coupling shaft portion is coupled to the first shaft such that torque can be transmitted and axial relative displacement is prevented and before press-fitting the other of the coupling shaft portions into the coupling hole formed in the second shaft, at least portions of the first and second stopper portions can be engaged with each other with a circumferential gap therebetween.

Also, when implementing the electric power steering device of the present invention, a first stopper portion provided on one axial portion (an axial end portion or the axially intermediate portion) of the first shaft and a second stopper portion provided on one axial portion (an axial end portion or the axially intermediate portion) of the second shaft are preferably engaged with each other with a circumferential gap therebetween such that relative rotations of the first and second shafts are restrained within a predetermined angle range.

Also, the one of coupling shaft portions is press-fitted into a coupling hole formed in the first shaft.

Also, the other of the coupling shaft portion is press-fitted into a coupling hole formed in the second shaft and abuts on a bottom end portion of the coupling hole.

Further, there is a size relation that at assembling, at a state where the other of the coupling shaft portions is press-fitted into the coupling hole formed in the second shaft and abuts on the bottom end portion of the coupling hole, after the torsion bar is inserted into the inner diameter side of the first shaft and before press-fitting the one of the coupling shaft portions into the coupling hole formed in the first shaft, at least portions of the first and second stopper portions can be engaged with each other with a circumferential gap therebetween.

Also, when implementing the electric power steering device of the present invention, a first stopper portion provided on one axial portion (an axial end portion or the axially intermediate portion) of the first shaft and a second stopper portion provided on one axial portion (an axial end portion or the axially intermediate portion) of the second shaft are preferably engaged with each other with a circumferential gap therebetween such that relative rotations of the first and second shafts are restrained within a predetermined angle range.

Also, the one of the coupling shaft portions is press-fitted into a coupling hole formed in the first shaft.

Also, the other of the coupling shaft portions is press-fitted into a coupling hole formed in the second shaft and abuts on a bottom end portion of the coupling hole.

There is a size relation that at assembling, before press-fitting of the coupling shaft portions such that while press-fitting the other of the coupling shaft portions into the coupling hole formed in the second shaft to abut on the bottom end portion of the coupling hole and the one of the coupling shaft portions is press-fitted into the coupling hole formed in the first shaft after the torsion bar is inserted into the inner diameter side of the first shaft, at least portions of the first and second stopper portions can be engaged with each other with a circumferential gap therebetween.

Also, when implementing the electric power steering device of the present invention, preferably, the first shaft has a center hole, a tip portion of the center hole at a side of the second shaft is formed with a slide bush insertion hole, and a slide bush is inserted into the slide bush insertion hole.

More preferably, the other of the coupling shaft portions coupled with the coupling hole formed in the second shaft is formed to be axially long to contact the slide bush.

Also, a method of assembling the electric power steering device of the present invention includes arranging the torsion bar at the inner diameter side of the first shaft and coupling the one of the coupling shaft portions to the first shaft such that torque can be transmitted and axial relative displacement is prevented. The method further includes engaging at least portions of the first and second stopper portions each other with a circumferential gap therebetween and press-fitting the other of the coupling shaft portion into the coupling hole formed in the second shaft at a state where a positional relation between the first and second shafts in a rotating direction is adjusted to a center position of the predetermined angle range.

Also, a method of assembling the electric power steering of the present invention includes inserting the torsion bar into the inner diameter side of the first shaft at a state where the other of the coupling shaft portions is press-fitted into the coupling hole formed in the second shaft to abut on the bottom end portion of the coupling hole. Further, the method includes engaging at least portions of the first and second stopper portions each other with a circumferential gap therebetween, and press-fitting the one of the coupling shaft portions into the coupling hole formed in the first shaft at a state where a positional relation between the first and second shafts in a rotating direction is adjusted to a center position of the predetermined angle range.

Also, a method of assembling the electric power steering device of the present invention includes engaging at least portions of the first and second stopper portions each other with a circumferential gap therebetween, inserting the torsion bar into the inner diameter side of the first shaft at a state where a positional relation between the first and second shafts in a rotating direction is adjusted to a center position of the predetermined angle range, press-fitting the other of the coupling shaft portions into the coupling hole formed in the second shaft to abut on the bottom end portion of the coupling hole, and press-fitting the one of the coupling shaft portions into the coupling hole formed in the first shaft.

Effects of the Invention

According to the electric power steering device and the method for assembling the same of the present invention, when press-fitting one of coupling shaft portions, which is to be later coupled to a counter-shaft, of the pair of coupling shaft portions which are both axial end portions of the torsion bar, into the coupling hole formed in a counter-shaft or when press-fitting the pair of coupling shaft portions into the coupling holes of the first and second shaft, it is possible to prevent the spring shaft portion, which is the axially intermediate portion of the torsion bar, from buckling.

That is, according to the present invention, when press-fitting the coupling shaft portion of the torsion bar into the coupling hole formed in the counter-shaft, the axially high compressive force may be applied to the spring shaft portion. However, even though the spring shaft portion tends to buckle due to the axially high compressive force, the diametrical extension portion provided on one of the outer peripheral surface of the axially intermediate portion of the spring shaft portion and the inner peripheral surface of the axially intermediate portion of the first shaft is in contact with or is to contact the opposing surface, so that the buckling deformation is prevented.

Also, according to the present invention, since it is possible to prevent the buckling deformation of the spring shaft portion, it is possible to easily lower the stiffness of the torsion bar so as to reduce the vibrations to be transmitted from the steered wheels to the steering wheel and to improve the detection sensitivity of the steering torque.

BRIEF DESCRIPTION OF THE DRAWINGS

FIG. 3 is a sectional view showing a process of assembling some components such as an input shaft, an output shaft, a torsion bar and the like.

DETAILED DESCRIPTION OF EMBODIMENTS

[First Embodiment]

Figure 1:
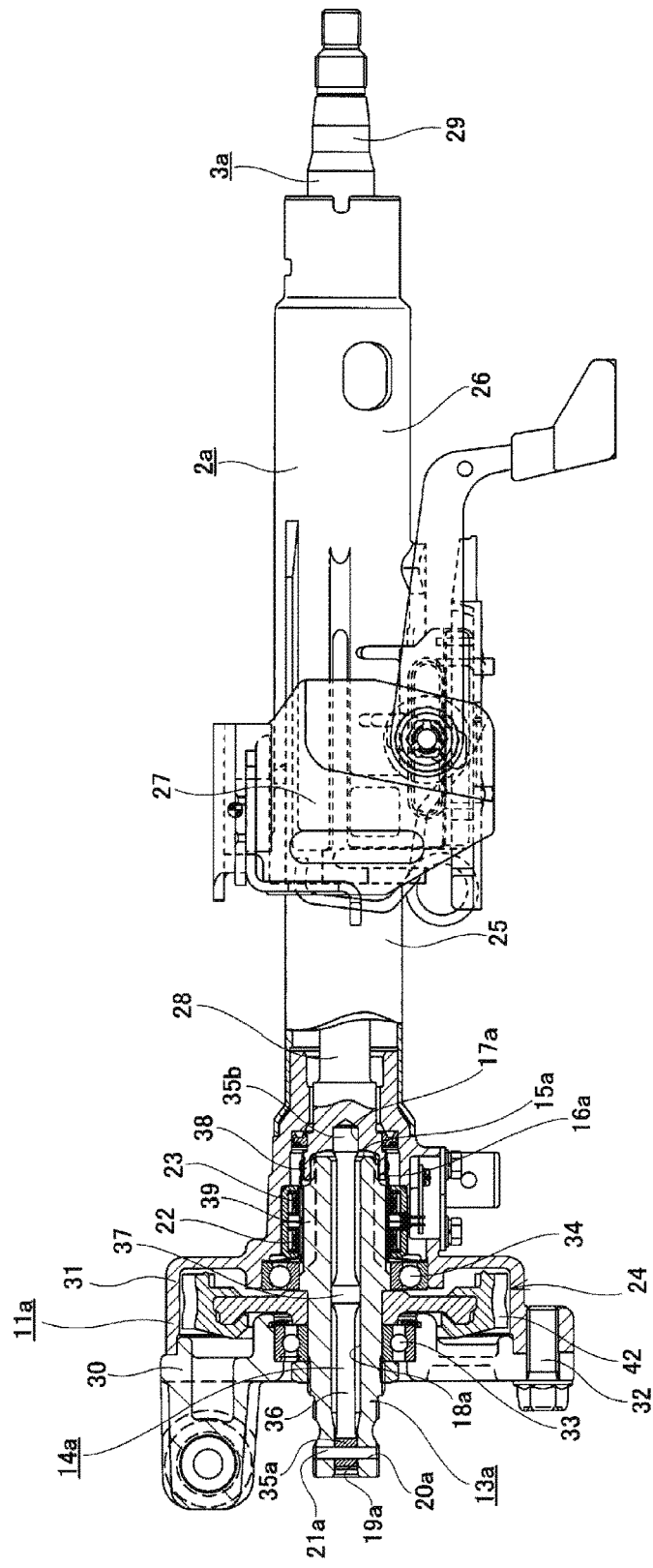
FIG. 1 is a partially cut side view showing a first embodiment of the present invention.
Figure 2:
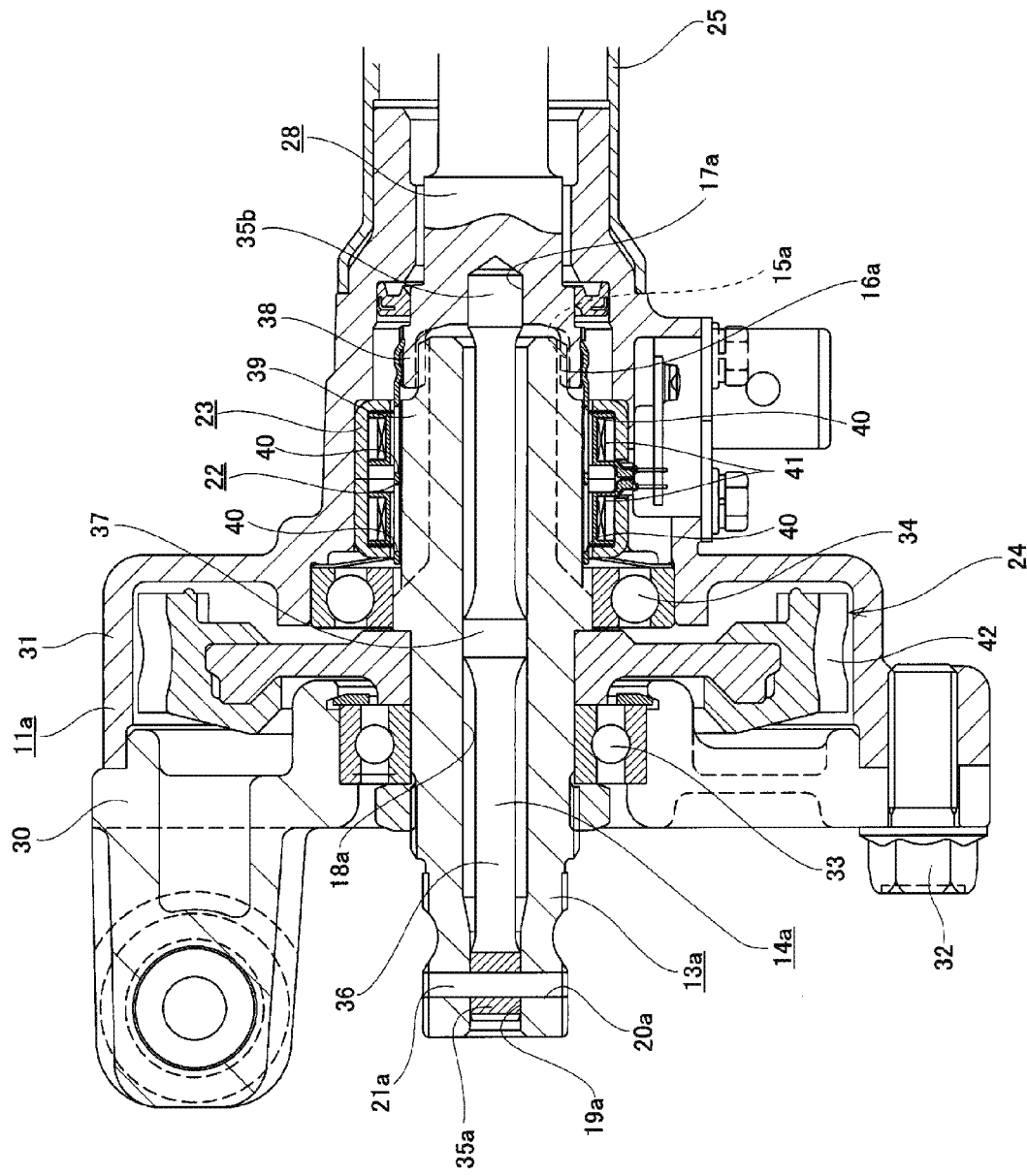
FIG. 2 is an enlarged view of a left end portion of FIG. 1.
Figure 21:
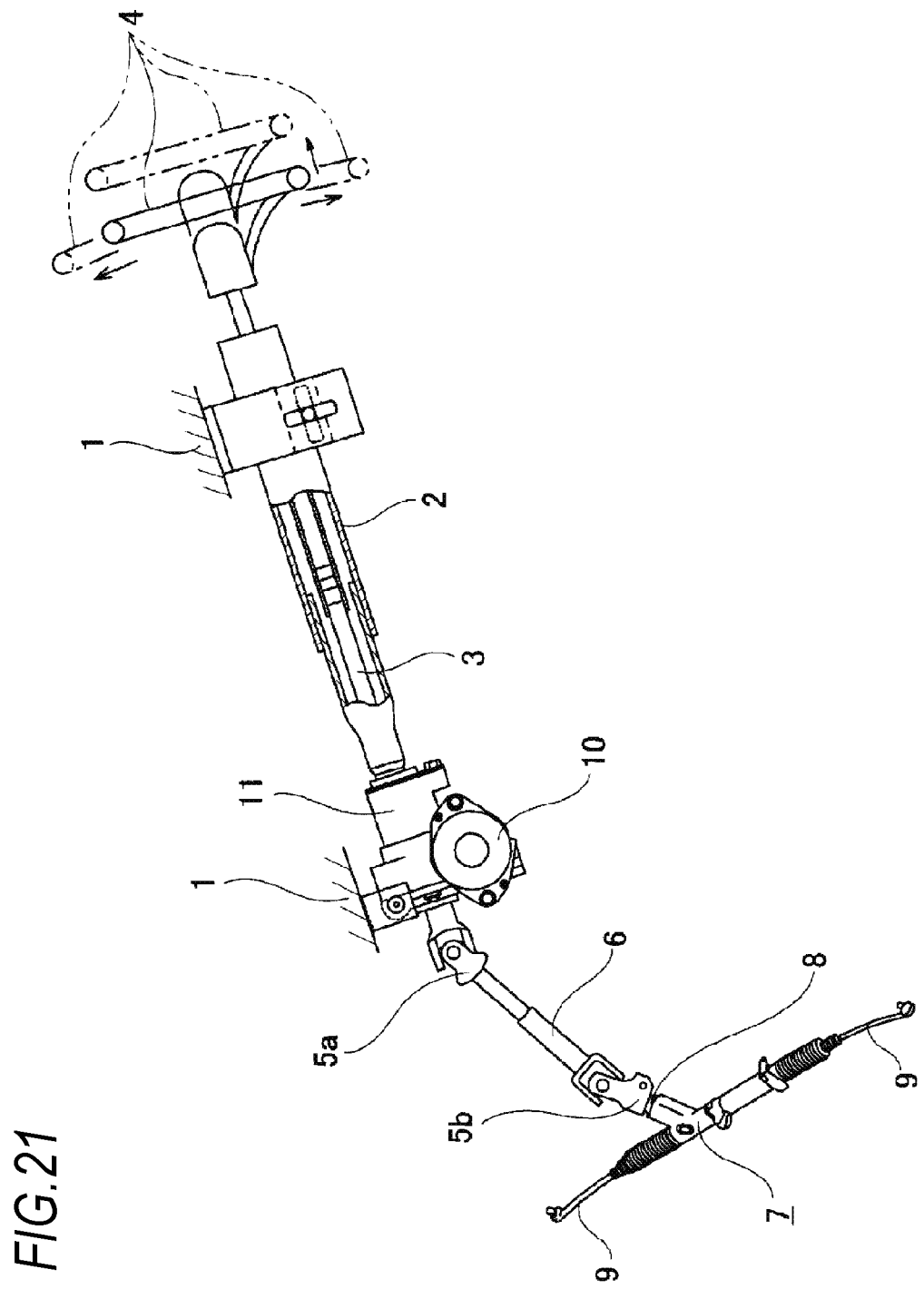
FIG. 21 is a partially cut side view showing a known electric power steering device.
Figure 22:
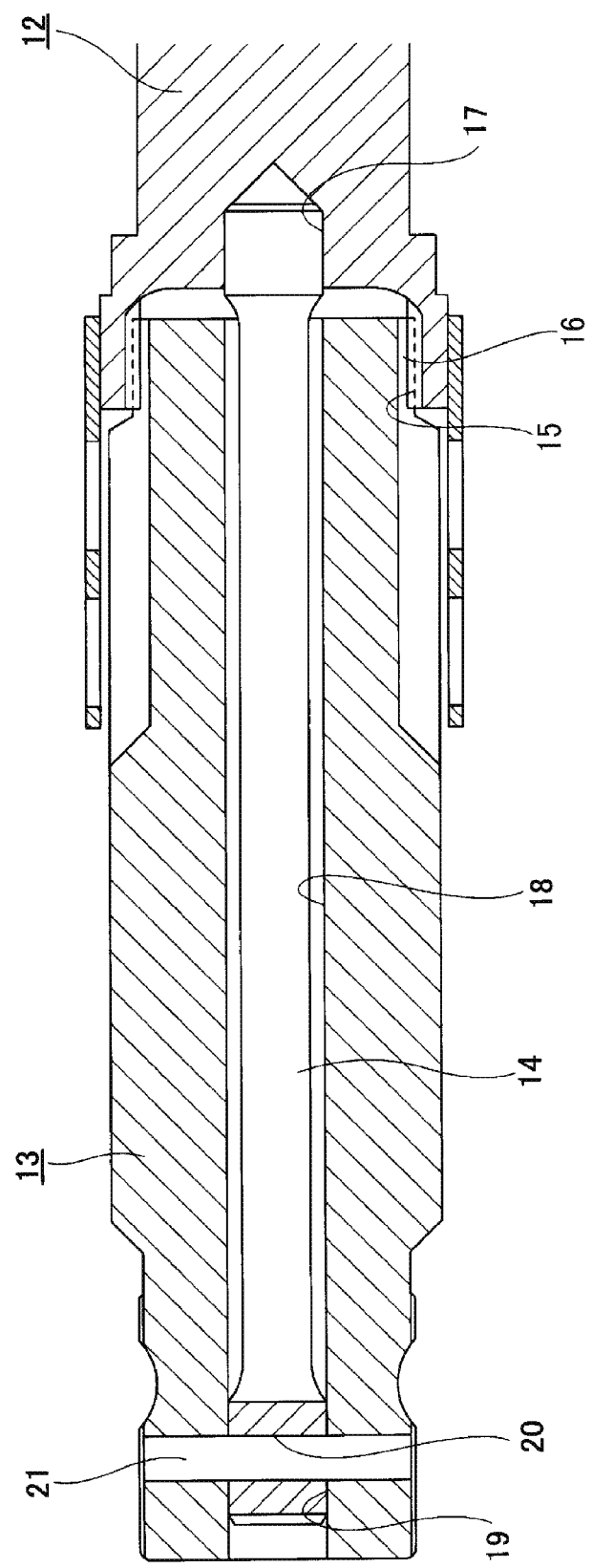
FIG. 22 is a sectional view showing some components such as an input shaft, an output shaft, a torsion bar and the like taken out from a housing of the known electric power steering device.

A first embodiment of the present invention is described with reference to FIGS. 1 to 5. In FIG. 1, the left side is a front side and the right side is a rear side. An electric power steering device of the first embodiment has a steering column 2a, a steering shaft 3a, a housing 11a, an output shaft 13a, a torsion bar 14a, a torque detection sleeve 22, a torque detection coil unit 23, an electric motor 10 (refer to FIG. 21), and a worm-type decelerator 24.

The steering column 2a is configured by telescopically combining a cylindrical inner column 25 arranged at the front side and a cylindrical outer column 26 arranged at the rear side, and is supported to a vehicle body by a support bracket 27. The inner column 25 and the outer column 26 are made of steel or light alloy such as aluminum alloy.

The steering shaft 3a is configured by spline-fitting a hollow upper shaft 29 arranged at the rear side to a lower shaft 28 arranged at the front side such that torque can be transmitted and axial relative displacement can be made, and is rotatably supported inside the steering column 2a. The lower shaft 28 and the upper shaft 29 are made of steel. A steering wheel 4 (refer to FIG. 21) is fixed to a rear end portion of the upper shaft 29 protruding from a rear end opening of the outer column 26.

The housing 11a is configured by coupling a front-side cover body 30 and a rear-side main body 31, each of which is made of light alloy such as aluminum alloy, with a plurality of bolts 32, and is coupled and fixed to a front end portion of the inner column 25. A front end portion of the lower shaft 28 is inserted inside the housing 11a.

The output shaft 13a is made to have a hollow shape by steel, which is magnetic metal, and is rotatably supported to a front side of the lower shaft 28 in the housing 11a by a pair of ball bearings 33, 34. A universal joint 5a (refer to FIG. 21) is coupled to a front end portion of the output shaft 13a protruding from a front end opening of the housing 11a.

The torsion bar 14a is made of steel such as spring steel, and has a pair of coupling shaft portions 35a, 35b at both axial end portions and a spring shaft portion at an axially intermediate portion between the coupling shaft portion 35a, 35b. Also, an axially center portion of the spring shaft portion 36 is provided with a large diameter portion 37 having a larger outer diameter size than portions adjacent to both axial sides thereof and configured as a diametrical extension portion. An outer diameter size of the spring shaft portion 36 is configured to be smaller than outer diameter sizes of the coupling shaft portion 35a, 35b at portions at least except for the large diameter portion 37. At a state where the torsion bar 14a is arranged at an inner diameter side of the output shaft 13a, a cylindrical outer peripheral surface of the large diameter portion 37 is positioned close to a cylindrical inner peripheral surface of the output shaft 13a (positioned closer to the cylindrical inner peripheral surface of the output shaft than outer peripheral surfaces of portions adjacent to both axial sides of the large diameter portion 37) or is in contact with the cylindrical inner peripheral surface of the output shaft without an interference. The front-side coupling shaft portion 35a is coupled to the output shaft 13a (the first shaft) and the rear-side coupling shaft portion 35b is coupled to the lower shaft 28 (the second shaft, the input shaft) such that torque can be transmitted.

In the first embodiment, in order to couple the front-side coupling shaft portion 35a to the output shaft 13a such that torque can be transmitted, the front-side coupling shaft portion 35a is fitted in a coupling hole 19a formed in a front end portion of a center hole 18a of the output shaft 13a. At this state, a pin 21a is press-fitted into a diametrical through hole 20a formed at a position where the front-side coupling shaft portion 35a and the front end portion of the output shaft 13a are matched. In order to couple the rear-side coupling shaft portion 35b to the lower shaft 28 such that torque can be transmitted, the rear-side coupling shaft portion 35b is fitted in a bottomed coupling hole 17a formed in an inner diameter side of a front end side portion of the lower shaft 28. Thereby, male serration subject to hardening processing such as quenching and provided on an outer peripheral surface of the rear-side coupling shaft portion 35*b* is mechanically bitten to a cylindrical inner peripheral surface of the coupling hole 17*a* for which the hardening processing is not performed.

The front end portion of the lower shaft 28 is provided with a cylindrical portion 38. An inner peripheral surface of the cylindrical portion 38 is provided with a female stopper portion 15*a* (the second stopper portion) having a circumferential concavo-convex shape (a toothed wheel shape). The female stopper portion 15*a* is configured by circumferentially arranging a plurality of female tooth portions and female recess portions, each of which is axially long, alternately and at an equal pitch on an inner peripheral surface of the cylindrical portion 38.

On the other hand, an outer peripheral surface of a rear end portion of the output shaft 13*a* is provided with a male stopper portion 16*a* (the first stopper portion) having a circumferential concavo-convex shape (a toothed wheel shape). The male stopper portion 16*a* is configured by circumferentially arranging a plurality of male tooth portions and male recess portions, each of which is axially long, alternately and at an equal pitch on the outer peripheral surface of the rear end portion of the output shaft 13*a*. The number of the male tooth portions (male recess portions) and the number of the female recess portions (female tooth portions) are the same.

The female stopper portion 15*a* and the male stopper portion 16*a* as described above are matingly engaged with each other such that relative rotation can be made (like loose spline engagement) within a predetermined angle range (for example, ±5° with respect to a neutral state where the spring shaft portion 36 of the torsion bar 14*a* is not distorted). That is, the respective female tooth portions (respective male tooth portions) are loosely engaged with the respective male recess portions (respective female recess portions) with gaps being respectively interposed at both circumferential both sides, so that the relative rotations of the lower shaft 28 and the output shaft 13*a* are restrained within the predetermined angle range. Thereby, the spring shaft portion 36 of the torsion bar 14*a* is prevented from being excessively distorted.

Also, a rear end side portion of the outer peripheral surface of the output shaft 13*a*, which is adjacent to a front side of the male stopper portion 16*a* in the axial direction, is provided with a torque detection concavo-convex portion 39 having a diameter of a circumscribed circle larger than the male stopper portion 16*a* and a concavo-convex shape (toothed wheel shape) in the circumferential direction. The torque detection concavo-convex portion 39 is configured by forming a plurality of detection recess portions, each of which is axially long, at an equal distance in the circumferential direction on the rear end side portion of the outer peripheral surface of the output shaft 13*a*. In the first embodiment, the number of the detection recess portions and the number of the male recess portions configuring the male stopper portion 16*a* are the same. Also, the detection recess portions and the male recess portions are continuously provided in the axial direction.

The torque detection sleeve 22 is made to have a cylindrical shape by conductive and non-magnetic metal such as aluminum alloy, and is concentrically arranged at an outer diameter side of the torque detection concavo-convex portion 39. A rear end portion, which is a base end portion of the torque detection sleeve 22, is fitted and fixed to an outer side of the cylindrical portion 38. A plurality of window holes 40, 40 having a substantially rectangular shape and arranged in a plurality of lines in the axial direction and at an equal distance in the circumferential direction is formed from a front end portion and to an intermediate portion of the torque detection sleeve 22, which are arranged at the outer diameter side of the torque detection concavo-convex portion 39. Circumferential pitches of the window holes 40, 40 in both lines are offset each other by a half pitch.

The torque detection coil unit 23 is cylindrical and is concentrically arranged at the outer diameter sides of the torque detection concavo-convex portion 39 and the torque detection sleeve 22. The torque detection coil unit 23 is fitted and fixed inside the housing 11*a*, and has a pair of coils 41, 41. Both the coils 41, 41 are arranged to diametrically overlap with portions of the torque detection sleeve 22, at which the window holes 40, 40 of both lines are provided.

The worm-type decelerator 24 is configured by combining a worm wheel 42 and a worm (not shown). The worm wheel 42 is fitted and fixed to an outer side of a substantially axially center portion of the output shaft 13*a* between the ball bearings 33, 34. Also, the worm (not shown) is rotatably supported inside the housing 11*a* with being meshed with the worm wheel 42.

The electric motor 10 (refer to FIG. 21) is supported and fixed to the housing 11*a*. An output shaft of the electric motor 10 is coupled to a base end portion of the worm (not shown) such that torque can be transmitted.

Figure 3:
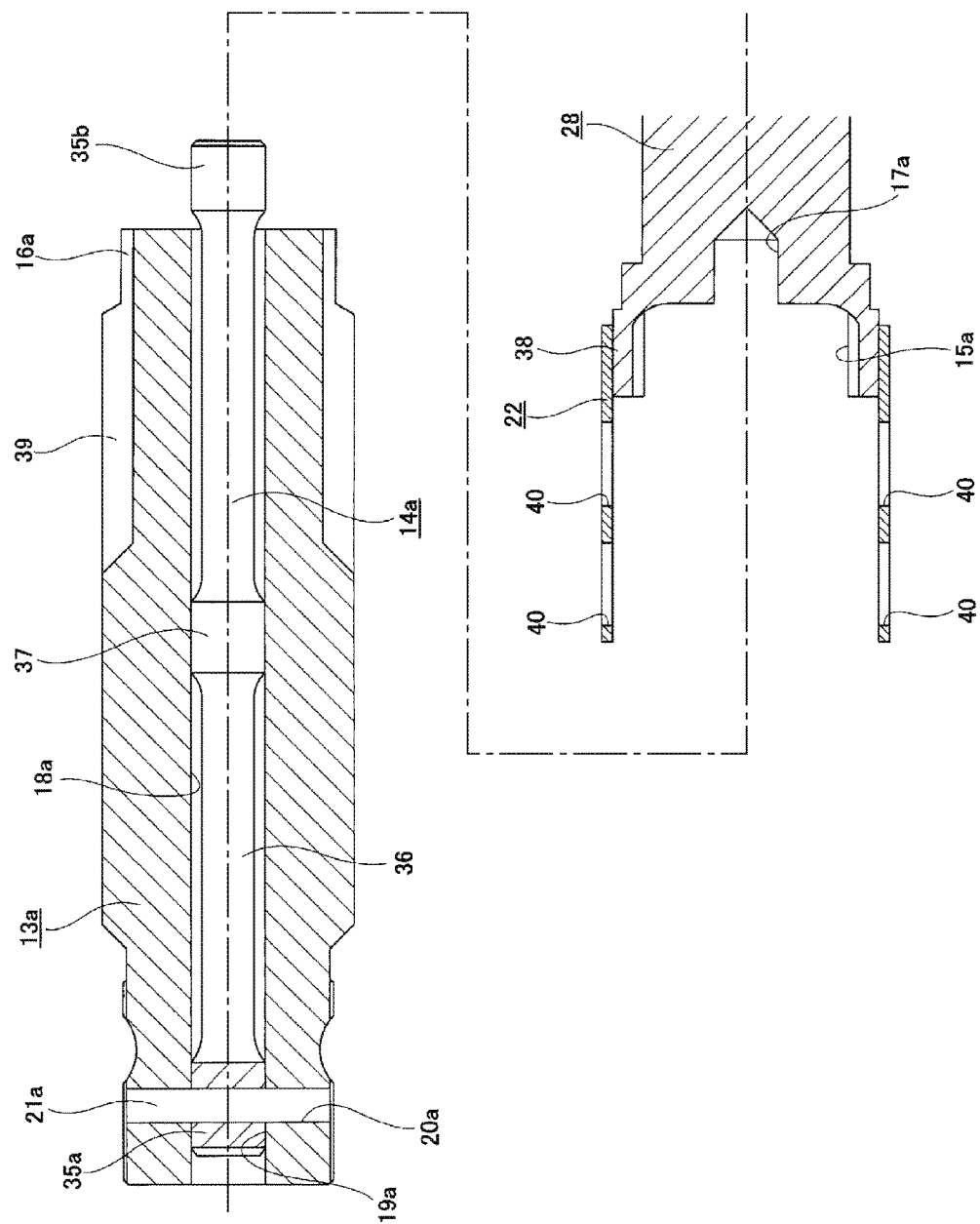

In the electric power steering device of the first embodiment as described above, when assembling the lower shaft 28, the output shaft 13*a* and the torsion bar 14*a*, the torsion bar 14*a* is first arranged at the inner diameter side of the output shaft 13*a*, as shown in the upper half part of FIG. 3. Then, at a state where the front-side coupling shaft portion 35*a* of the torsion bar 14*a* is fitted in the coupling hole 19*a* of the output shaft 13*a*, the pin 21*a* is press-fitted into the diametrical through hole 20*a* formed at the portion where the coupling shaft portion 35*a* and the output shaft 13*a* are matched. Thereby, the coupling shaft portion 35*a* is coupled to the output shaft 13*a* such that torque can be transmitted and axial relative displacement is prevented. In the meantime, the portions of the through hole 20*a* corresponding to the coupling shaft portion 35*a* and the output shaft 13*a* may be formed at the same time by drilling processing or may be formed separately before the assembling operation with the coupling shaft portion 35*a* being fitted in the coupling hole 19*a*. As shown in the lower half part of FIG. 3, the base end portion of the torque detection sleeve 22 is fitted and fixed to the outer side of the cylindrical portion 38 of the lower shaft 28.

Figure 4:
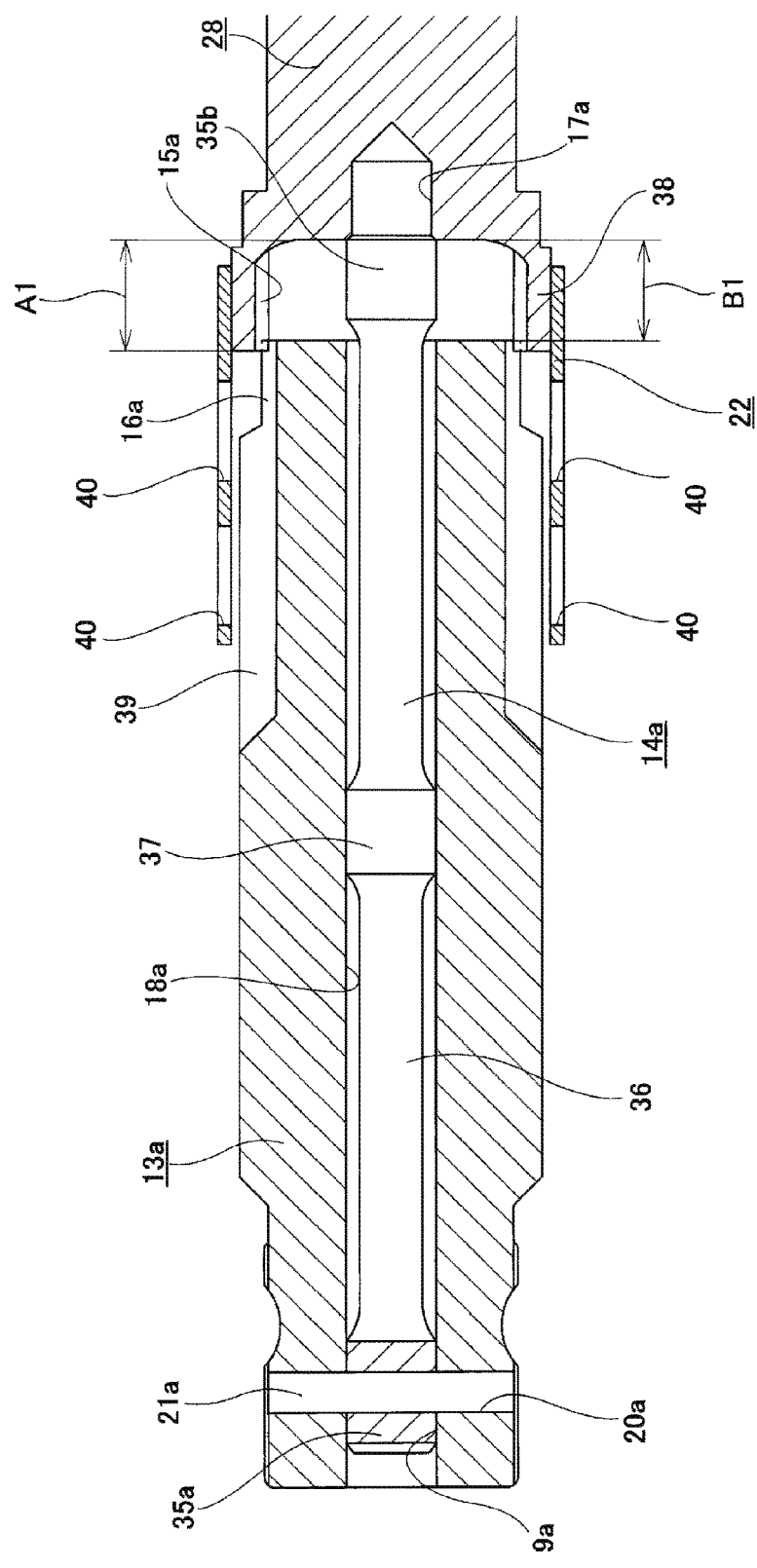
FIG. 4 is a sectional view showing a stage of the assembling subsequent to FIG. 3.

Then, as shown in order of FIG. 3 and FIG. 4, the rear end portion of the male stopper portion 16*a*, which is provided on the outer peripheral surface of the rear end portion of the output shaft 13*a*, and the front end portion of the female stopper portion 15*a*, which is provided on the inner peripheral surface of the cylindrical portion 38 of the lower shaft 28, are engaged with each other with the circumferential gap therebetween, and a rear end edge portion of the rear-side coupling shaft portion 35*b* of the torsion bar 14*a* is engaged into the opening of the coupling hole 17*a* of the lower shaft 28. In the meantime, according to the first embodiment, in order to engage the rear end portion of the male stopper portion 16*a* and the front end portion of the female stopper portion 15*a* with the circumferential gap therebetween before press-fitting the coupling shaft portion 35*b* into the coupling hole 17*a* in this manner, an axial size A1 from the opening of the coupling hole 17*a* to a front end edge of the female stopper portion 15a at the state shown in FIGS. 3 and 4 is set to be slightly greater than an axial size B1 (a protruding amount of the coupling shaft portion 35b from the rear end opening of the center hole 18a of the output shaft 13a) from a rear end edge of the male stopper portion 16a to a rear end edge portion of the coupling shaft portion 35b (A1>B1).

Then, at the state shown in FIG. 4, the engaged state between the male and female stopper portions 16a, 15a is made to be neutral in the circumferential direction, so that a positional relation between the lower shaft 28 and the output shaft 13a in the rotating direction is adjusted to a center position of a predetermined angle range. Then, at this state, as shown in order of FIG. 4 and FIG. 5, the coupling shaft portion 35b is press-fitted into the coupling hole 17a. Thereby, the coupling shaft portion 35b is coupled to the lower shaft 28 such that torque can be transmitted. In the meantime, in the first embodiment, when press-fitting the coupling shaft portion 35b into the coupling hole 17a, the axially reactive force applied to the torsion bar 14a can be sufficiently supported by the pin 21a.

Figure 5:
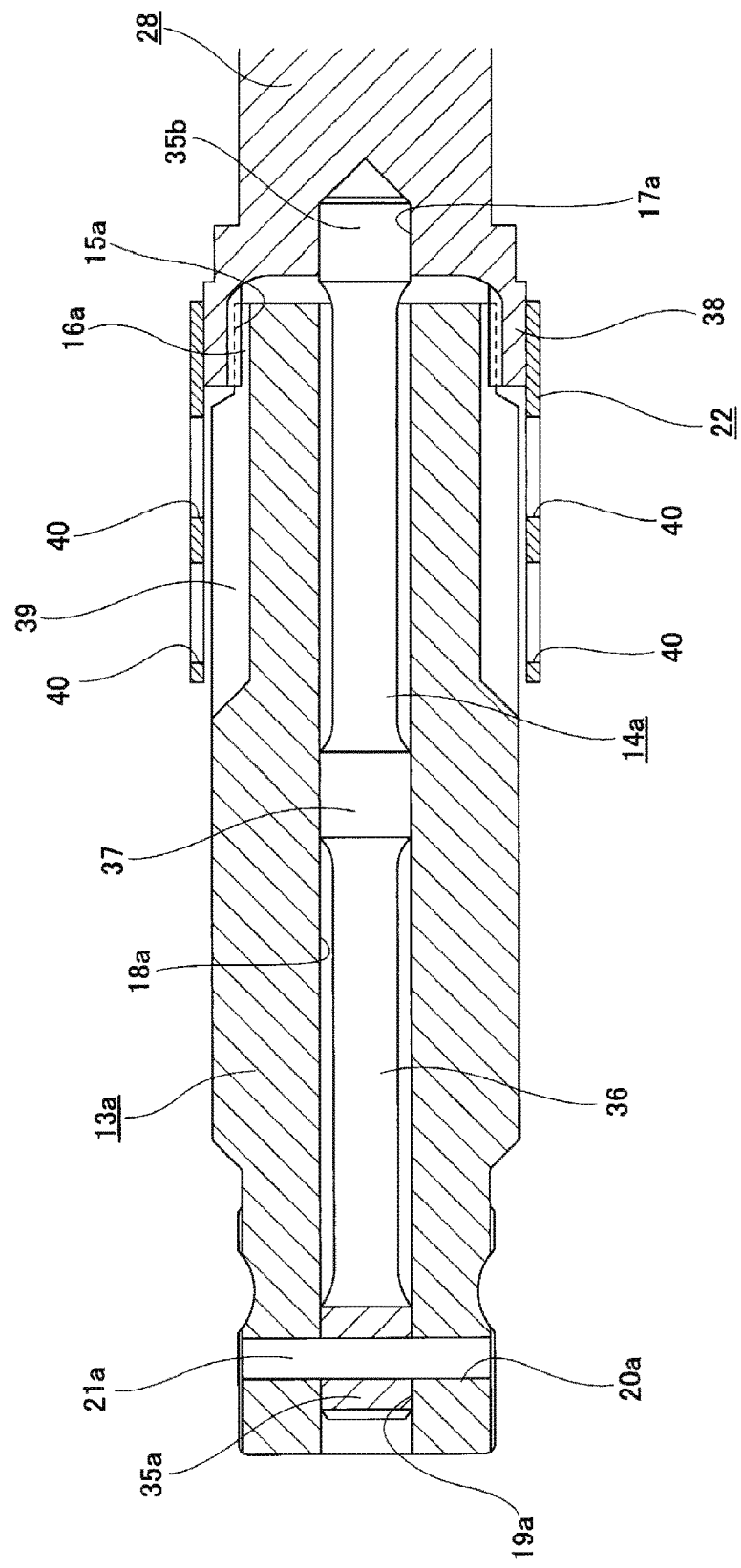
FIG. 5 is a sectional view showing a state after completion of the assembling.

In the meantime, when implementing the structure of the first embodiment, the other constitutional members may be assembled to the respective constitutional members shown in FIGS. 3 to 5 in appropriate order. That is, the specific assembling order is not particularly limited.

According to the electric power steering device configured as described above, when a driver operates the steering wheel 1 and torque, which is a steering force, is thus applied to the steering shaft 3a, the torsion bar 14a is elastically distorted (within a predetermined angle range) in correspondence to a direction and a magnitude of the torque. Accordingly, the circumferential positional relation of the torque detection concavo-convex portion 39 and the torque detection sleeve 22 is changed, so that impedance is changed in the coils 41, 41 configuring the torque detection coil unit 23. For this reason, based on the impedance change, it is possible to detect the direction and magnitude of the torque. The electric motor 10 generates auxiliary power corresponding to the direction and magnitude of the torque. The auxiliary power is increased by the worm-type decelerator 24 and is then applied to the output shaft 13a. As a result, the force which is necessary for the driver to operate the steering wheel 1 is reduced.

In the meantime, when the distortion amount of the spring shaft portion 36 of the torsion bar 14a reaches an upper limit of one or other side of the predetermined angle range as the high torque is input from the steering wheel 1 to the steering shaft 3a, the female stopper portion 15a and the male stopper portion 16a are circumferentially meshed. Based on the meshing, a portion of the torque is directly transmitted from the lower shaft 28 to the output shaft 13a. That is, even when the high torque is input from the steering wheel 1 to the steering shaft 3a, the excessive distortion is prevented from being generated in the spring shaft portion 36.

According to the electric power steering device and the method for assembling the same of the first embodiment as described above, as shown in order of FIG. 4 and FIG. 5, when press-fitting the coupling shaft portion 35b, which is to be later coupled to the counter-shaft (the lower shaft 28, the output shaft 13a), of the pair of coupling shaft portions 35a, 35b, which are both axial end portions of the torsion bar 14a, into the coupling hole 17a of the counter-shaft (the lower shaft 28), it is possible to prevent the spring shaft portion 36 of the torsion bar 14a from buckling. That is, according to the first embodiment, when press-fitting the coupling shaft portion 35b into the coupling hole 17a, the axially high compressive force is applied to the spring shaft portion 36. However, even though the spring shaft portion 36 tends to buckle due to the axially high compressive force, the outer peripheral surface of the large diameter portion 37 provided on the axially center portion of the spring shaft portion 36 is in contact with or is to contact the inner peripheral surface of the output shaft 13a, so that the buckling deformation is prevented.

In the meantime, the buckling deformation of the spring shaft portion 36 is deformation which the spring shaft portion 36 is bent into an arch shape. In contrast, according to the first embodiment, the large diameter portion 37 is provided on the axially center portion (a portion of which a diametrical displacement amount is greatest when the spring shaft portion 36 is buckling-deformed) of the spring shaft portion 36. For this reason, based on the contact between the outer peripheral surface of the large diameter portion 37 and the inner peripheral surface of the output shaft 13a, it is possible to efficiently prevent the buckling deformation of the spring shaft portion 36.

Also, according to the first embodiment, since it is possible to prevent the buckling deformation of the spring shaft portion 36 as described above, it is possible to easily lower the stiffness of the torsion bar 14a so as to reduce the vibrations to be transmitted from the steered wheels to the steering wheel and to improve the detection sensitivity of the steering torque.

Also, according to the first embodiment, at the assembling, as shown in FIG. 4, since it is possible to engage the axial end portions of the male and female stopper portions 16a, 15a before press-fitting the coupling shaft portion 35b into the coupling hole 17a, the positional relation between the lower shaft 28 and the output shaft 13a in the rotating direction can be easily adjusted to the center position of the predetermined angle range. Therefore, it is possible to easily realize the normal assembled state.

[Second Embodiment]

Figure 6:
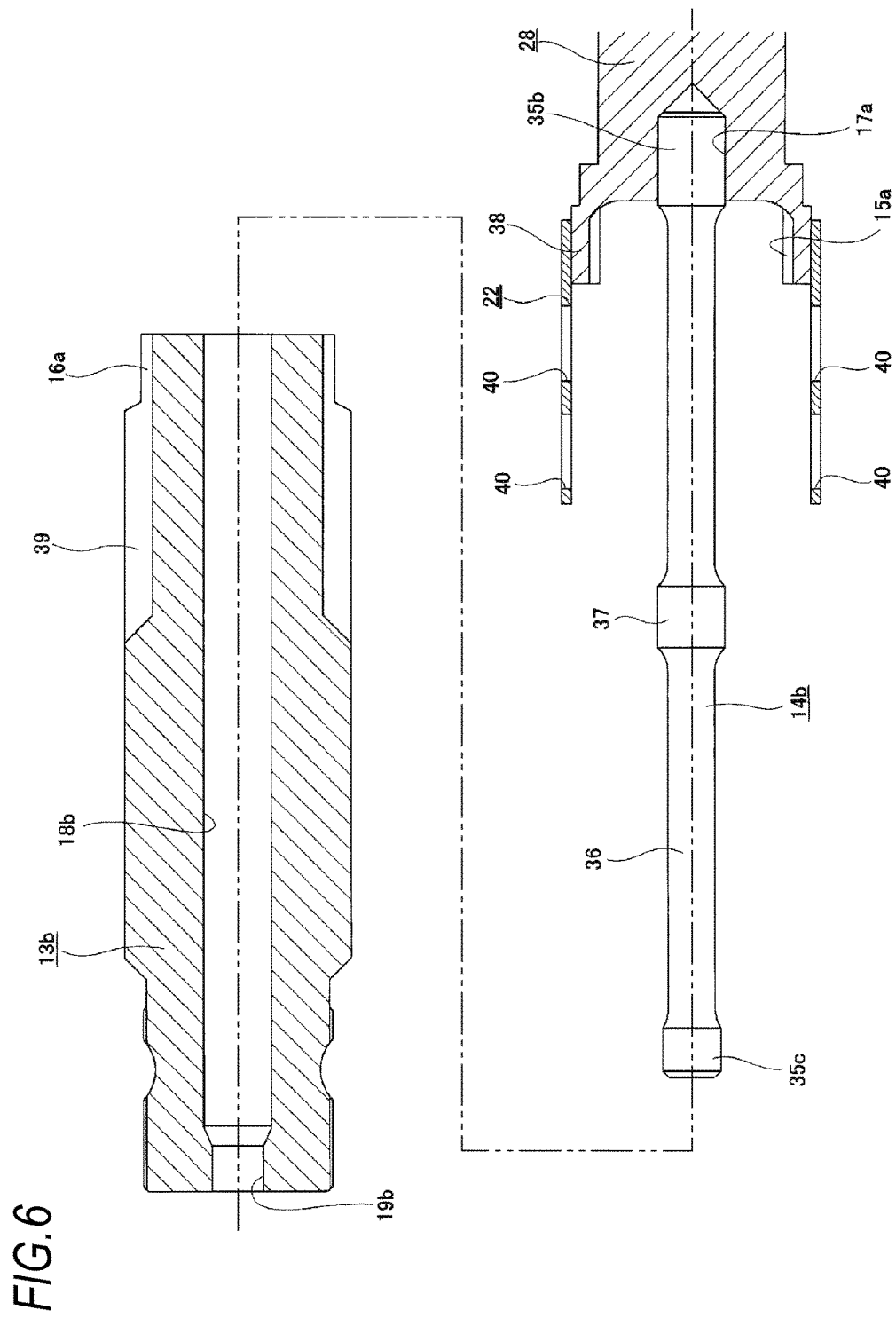
FIG. 6 is a sectional view showing a process of assembling some components such as an input shaft, an output shaft, a torsion bar and the like in a structure according to a second embodiment of the present invention.
Figure 7:
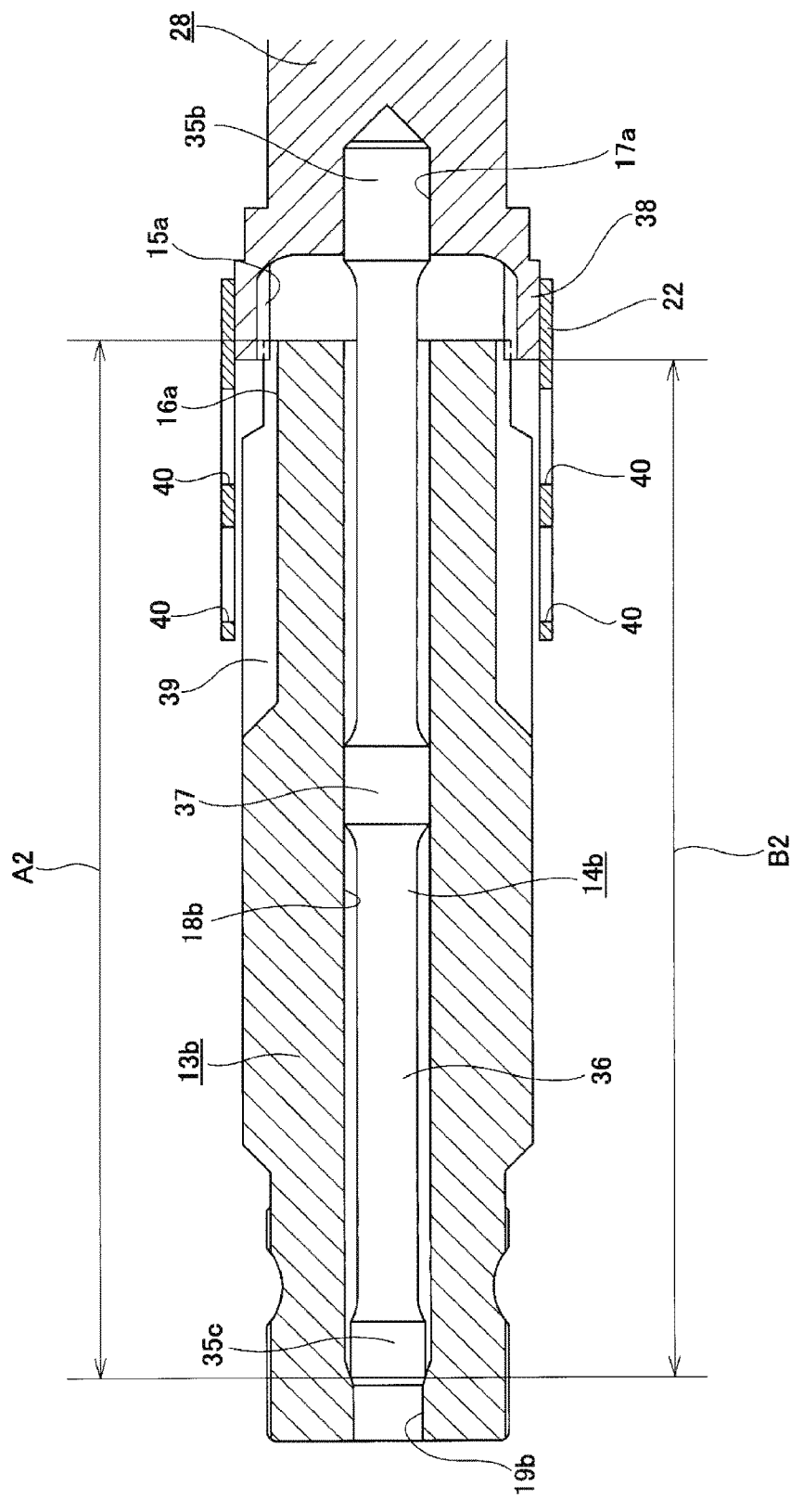
FIG. 7 is a sectional view showing a stage of the assembling subsequent to FIG. 6.
Figure 8:
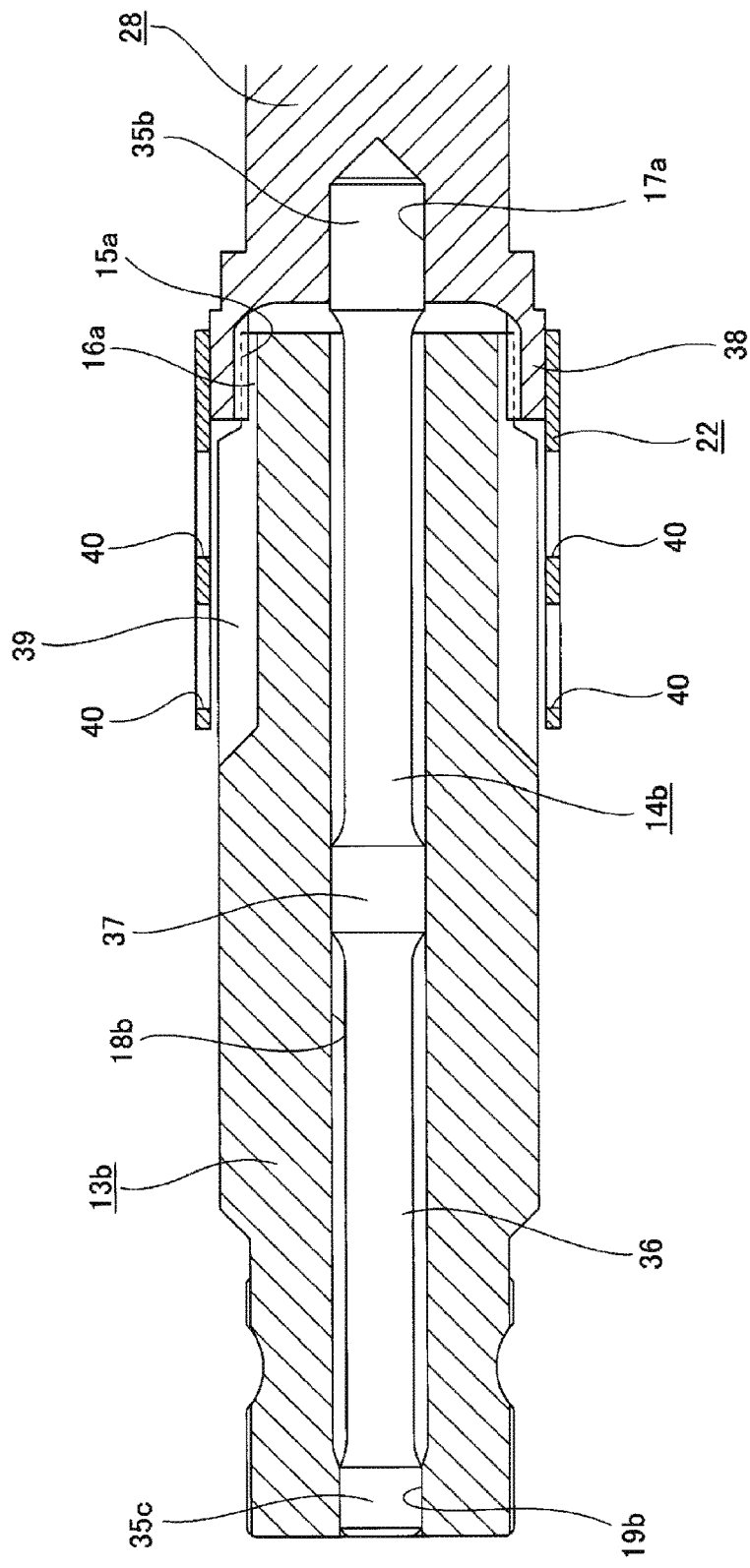
FIG. 8 is a sectional view showing a state after completion of the assembling.

A second embodiment of the present invention is described with reference to FIGS. 6 to 8. In FIGS. 6 to 8, the left side is a front side and the right side is a rear side.

In the second embodiment, as shown in FIG. 8, a structure for coupling a front-side coupling shaft portion 35c of a torsion bar 14b to an output shaft 13b such that torque can be transmitted is different from the first embodiment. That is, according to the second embodiment, in order to couple the coupling shaft portion 35c to the output shaft 13b such that torque can be transmitted, the coupling shaft portion 35c is press-fitted into a coupling hole 19b formed in a front end portion of a center hole 18b of the output shaft 13b. Thereby, male serration subject to hardening processing such as quenching and provided on an outer peripheral surface of the coupling shaft portion 35c is mechanically bitten to a cylindrical inner peripheral surface of the coupling hole 19b for which the hardening processing is not performed.

Also, according to the second embodiment, when assembling the lower shaft 28, the output shaft 13b and the torsion bar 14b, as shown in the lower half part of FIG. 6, the rear-side coupling shaft portion 35b of the torsion bar 14b is first press-fitted into the bottomed coupling hole 17a of the lower shaft 28 and abuts on a bottom end portion of the coupling hole 17a. Thereby, like the first embodiment, the coupling shaft portion 35b is coupled to the lower shaft 28 such that torque can be transmitted. The base end portion of the torque detection sleeve 22 is fitted and fixed to the outer side of the cylindrical portion 38 of the lower shaft 28.

Then, as shown in order of FIG. 6 and FIG. 7, the torsion bar 14b is inserted into the inner diameter side of the output shaft 13b, and the front end edge portion of the front-side coupling shaft portion 35c of the torsion bar 14b is engaged with the rear end opening of the coupling hole 19b of the output shaft 13b. The rear end portion of the male stopper portion 16a provided on the outer peripheral surface of the rear end portion of the output shaft 13b and the front end portion of the female stopper portion 15a provided on the inner peripheral surface of the cylindrical portion 38 of the lower shaft 28 are engaged with the circumferential gap therebetween. In the meantime, according to the second embodiment, in order to engage the rear end portion of the male stopper portion 16a and the front end portion of the female stopper portion 15a with the circumferential gap therebetween before press-fitting the coupling shaft portion 35c into the coupling hole 19b in this manner, an axial size A2 from the rear end opening of the coupling hole 19b to the rear end edge of the male stopper portion 16a at the state shown in FIGS. 6 and 7 is set to be slightly greater than an axial size B2 from the front end edge of the female stopper portion 15a to the front end edge portion of the coupling shaft portion 35c (A2>B2).

Then, at the state shown in FIG. 7, the engaged state between the male and female stopper portions 16a, 15a is made to be neutral in the circumferential direction, so that a positional relation between the lower shaft 28 and the output shaft 13b in the rotating direction is adjusted to a center position of a predetermined angle range within which the relative rotations of the lower shaft 28 and the output shaft 13b can be made. Then, at this state, as shown in order of FIG. 7 and FIG. 8, the coupling shaft portion 35c is press-fitted into the coupling hole 19b. Thereby, the coupling shaft portion 35c is coupled to the output shaft 13b such that torque can be transmitted. In the meantime, according to the second embodiment, when press-fitting the coupling shaft portion 35c into the coupling hole 19b, the axially reactive force to be applied to the torsion bar 14a can be sufficiently supported by the bottom end portion of the coupling hole 17a of the output shaft 13b.

According to the electric power steering device and the method for assembling the same of the second embodiment as described above, as shown in order of FIG. 7 and FIG. 8, when press-fitting the coupling shaft portion 35c, which is to be later coupled to the counter-shaft (the lower shaft 28, the output shaft 13b), of the pair of coupling shaft portions 35c, 35b, which are both axial end portions of the torsion bar 14b, into the coupling hole 19b of the counter-shaft (the output shaft 13b), it is possible to prevent the spring shaft portion 36 of the torsion bar 14b from buckling. That is, according to the second embodiment, when press-fitting the coupling shaft portion 35c into the coupling hole 19b, the axially high compressive force is applied to the spring shaft portion 36. However, even though the spring shaft portion 36 tends to buckle due to the axially high compressive force, the outer peripheral surface of the large diameter portion 37 provided at the axially center portion of the spring shaft portion 36 is in contact with or is to contact the inner peripheral surface of the output shaft 13b, so that the buckling deformation is prevented.

Also, according to the second embodiment, at the assembling, as shown in FIG. 7, since it is possible to engage the axial end portions of the male and female stopper portions 16a, 15a before press-fitting the coupling shaft portion 35c into the coupling hole 19b, the positional relation between the lower shaft 28 and the output shaft 13b with respect to the rotating direction can be easily adjusted to the center position of the predetermined angle range. Therefore, it is possible to easily realize the normal assembled state.

In the meantime, when implementing the structure of the second embodiment, the coupling shaft portion 35c and the output shaft 13b may be coupled and fixed by welding after press-fitting the front-side coupling shaft portion 35c into the coupling hole 19b of the output shaft 13b.

Since the other configurations and operations are the same as the first embodiment, the overlapping illustrations and descriptions are omitted.

[Third Embodiment]

Figure 9:
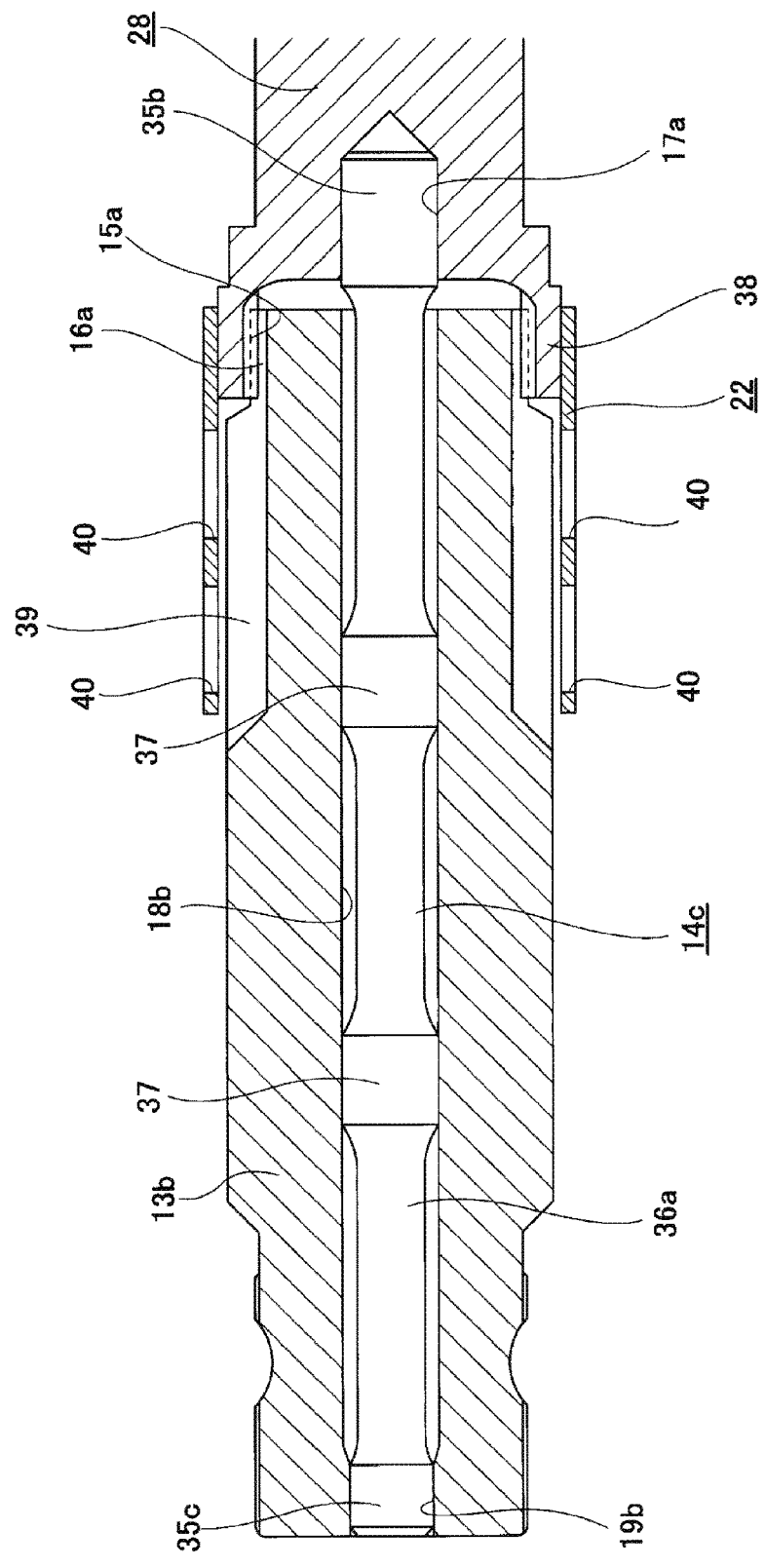
FIG. 9 is a similar view to FIG. 8, showing a third embodiment of the present invention.

FIG. 9 shows a third embodiment of the present invention. In the third embodiment, the number and axial positions of large diameter portions provided at an axially intermediate portion of a spring shaft portion 36a configuring a torsion bar 14c are different from the second embodiment. That is, in the third embodiment, a pair of large diameter portions 37, 37 are provided at both end side portion of the axially intermediate portion of the spring shaft portion 36a. Cylindrical outer peripheral surfaces of the large diameter portions 37, 37 are positioned closer to or in contact with the cylindrical inner peripheral surface of the output shaft 13b without an interference. In this way, according to the third embodiment, since the pair of large diameter portions 37, 37 are provided at both end side portions of the axially intermediate portion of the spring shaft portion 36a, it is possible to efficiently prevent the buckling deformation of the spring shaft portion 36a at the assembling, based on the contact between the outer peripheral surfaces of the large diameter portions 37, 37 and the inner peripheral surface of the output shaft 13b.

Since the other configurations and operations are the same as the second embodiment, the overlapping illustrations and descriptions are omitted.

In the meantime, the configuration where the large diameter portions are provided at the plurality of axial positions of the spring shaft portion, like the third embodiment, can also be applied to the first and second embodiments and fourth and seventh embodiments to be described later.

Figure 10:
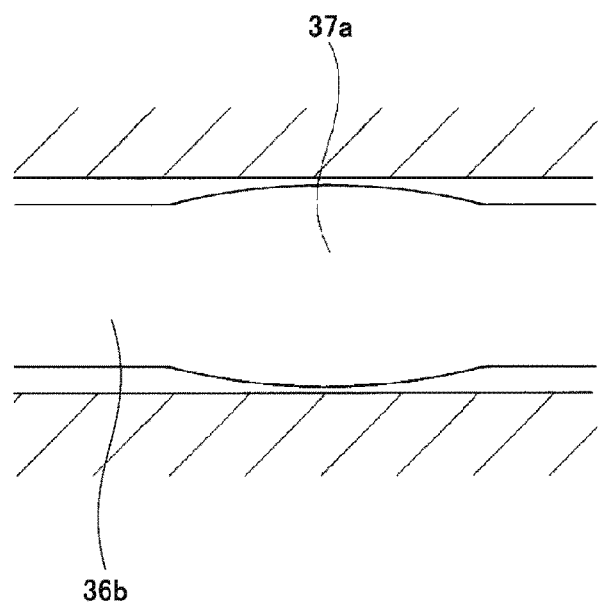
FIG. 10 is a partially sectional view showing a large diameter portion provided on a spring shaft portion of the torsion bar according to a modified embodiment.

In the first to third embodiments, the outer peripheral surface of the large diameter portion provided on the spring shaft portion is cylindrical. However, when implementing the present invention, the outer peripheral surface of the large diameter portion may be made to have a shape other than the cylindrical shape. For example, as shown in FIG. 10, an outer peripheral surface of a large diameter portion 37a provided on a spring shaft portion 36b may be made to have a shape such as an outer peripheral surface of a beer barrel.

When implementing the present invention, a low frictional material such as a synthetic resin may be coated on the outer peripheral surface of the large diameter portion provided on the spring shaft portion. When this configuration is adopted, a spring constant of the spring shaft portion is less likely to change even though the outer peripheral surface of the large diameter portion contacts the inner peripheral surface of the first shaft.

Also, when implementing the present invention, it is preferably to adopt a structure capable of easily enabling the press-fitting at the press-fitting of the coupling shaft portion of the torsion bar into the coupling hole of the counter-shaft. FIGS. 11 to 14 show four examples of the structure capable of easily enabling the press-fitting.

Figure 11:
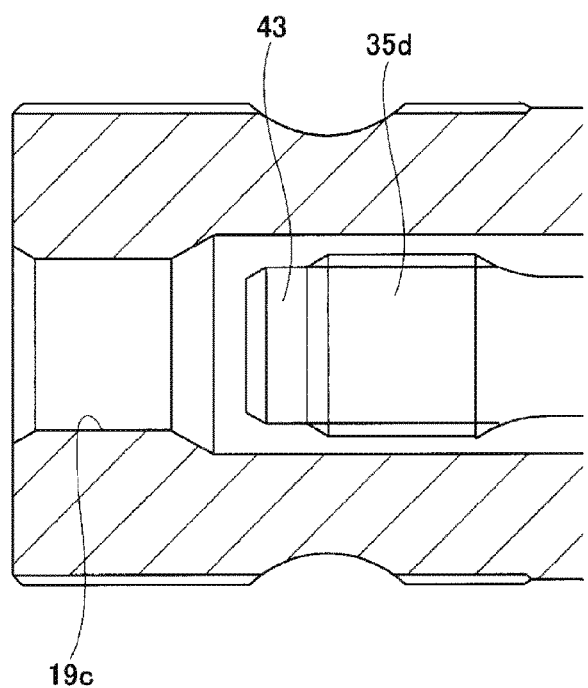
FIG. 11 is a sectional view of a main portion showing a first example of a structure capable of enabling an easy operation of press-fitting a coupling shaft portion into a coupling hole.

In the example of FIG. 11, a guide shaft portion 43 arranged concentrically with a coupling shaft portion 35d and having a diameter smaller than the coupling shaft portion 35d is provided at a portion adjacent to a tip-side (left side in FIG. 11) of the coupling shaft portion 35d. An outer peripheral surface of the guide shaft portion 43 is cylindrical except for a chamfered tip portion thereof. The guide shaft portion 43 is inserted into a coupling hole 19c without an interference, so that the coupling shaft portion 35d is aligned with respect to the coupling hole 19c. Thereby, the press-fitting of the coupling shaft portion 35d into the coupling hole 19c can be guided.

On the other hand, in the example of FIG. 11, the outer peripheral surface of the guide shaft portion 43 may be made to have a tapered shape as a whole such that a diameter size thereof decreases (tapers) as proceeding towards a left side of FIG. 11.

Figure 12:
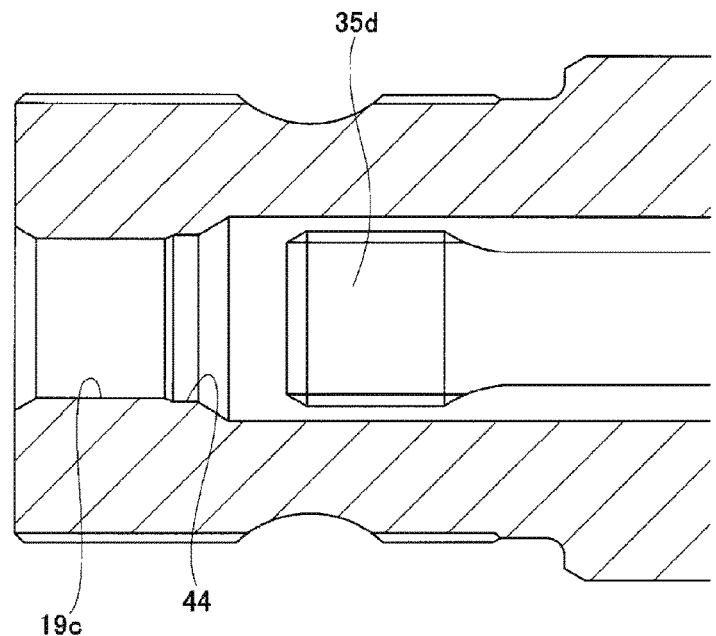
FIG. 12 is a sectional view of a main portion showing a second example of the structure capable of enabling an easy operation of press-fitting the coupling shaft portion into the coupling hole.

Also, in the example of FIG. 12, a guide hole 44 arranged concentrically with the coupling hole 19c and having a diameter greater than the coupling hole 19c is provided at a portion adjacent to an entrance-side (right side in FIG. 12) of the coupling hole 19c. An inner peripheral surface of the guide hole 44 is cylindrical except for a portion continuing to the coupling hole 19c. The tip portion of the coupling shaft portion 35d is inserted into the guide hole 44 without an interference, so that the coupling shaft portion 35d is aligned with respect to the coupling hole 19c. Thereby, the press-fitting of the coupling shaft portion 35d into the coupling hole 19c can be guided.

Figure 13:
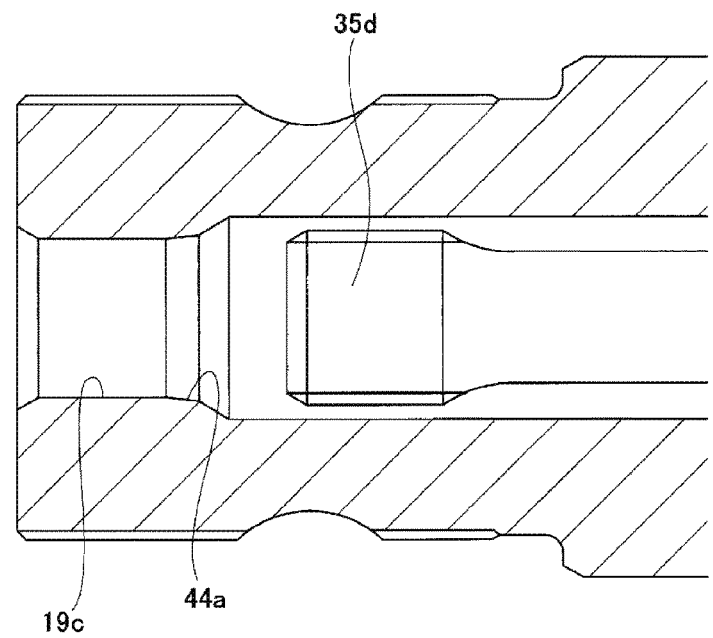
FIG. 13 is a sectional view of a main portion showing a third example of the structure capable of enabling an easy operation of press-fitting the coupling shaft portion into the coupling hole.

Also, in the example of FIG. 13, an inner peripheral surface of a guide hole 44a provided at the portion adjacent to the entrance-side (right side in FIG. 12) of the coupling hole 19c is made to have a tapered shape of which a diameter size decreases as proceeding towards a left side of FIG. 13 (a diameter size increase as proceeding towards a direction separating away from the coupling hole 19c in the axial direction).

Figure 14:
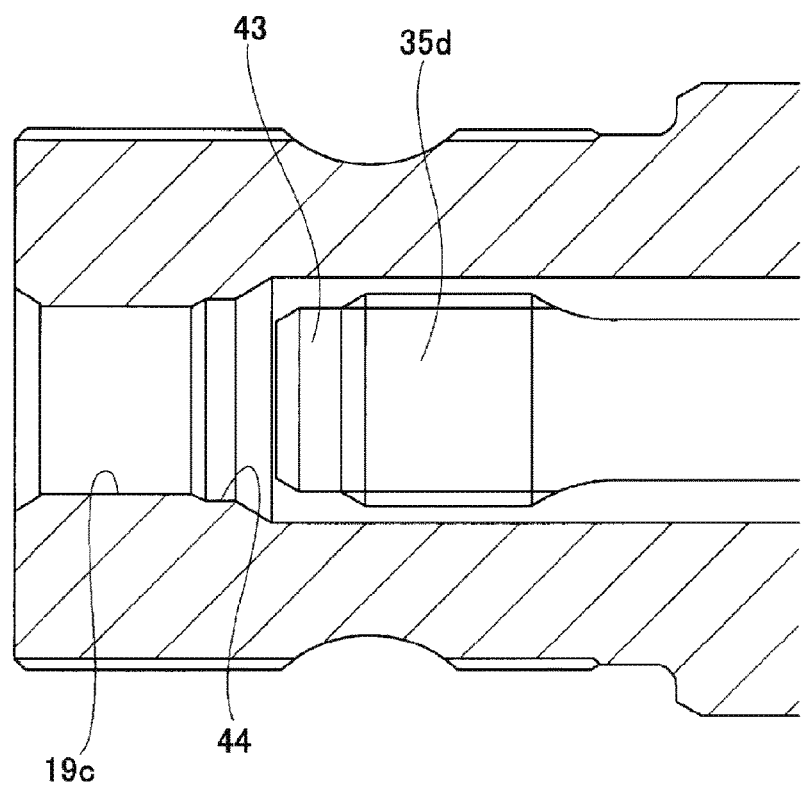
FIG. 14 is a sectional view of a main portion showing a fourth example of the structure capable of enabling an easy operation of press-fitting the coupling shaft portion into the coupling hole.

Also, the example of FIG. 14 shows a configuration where both the guide shaft portion 43 described in FIG. 11 and the guide hole 44 described in FIG. 12 are provided.

Meanwhile, in the example of FIG. 14, at least one of the outer peripheral surface of the guide shaft portion 43 and the inner peripheral surface of the guide hole 44 may be made to have a tapered shape as a whole such that a diameter size thereof decreases as proceeding towards a left side of FIG. 14.

In the meantime, when the guide shaft portion and/or the guide hole is provided, like the examples of FIGS. 11 to 14, the engaged state between the male and female stopper portions 16a, 15a can be easily made to be neutral in the circumferential direction with one being engaged with the other.

[Fourth Embodiment]

Figure 15:
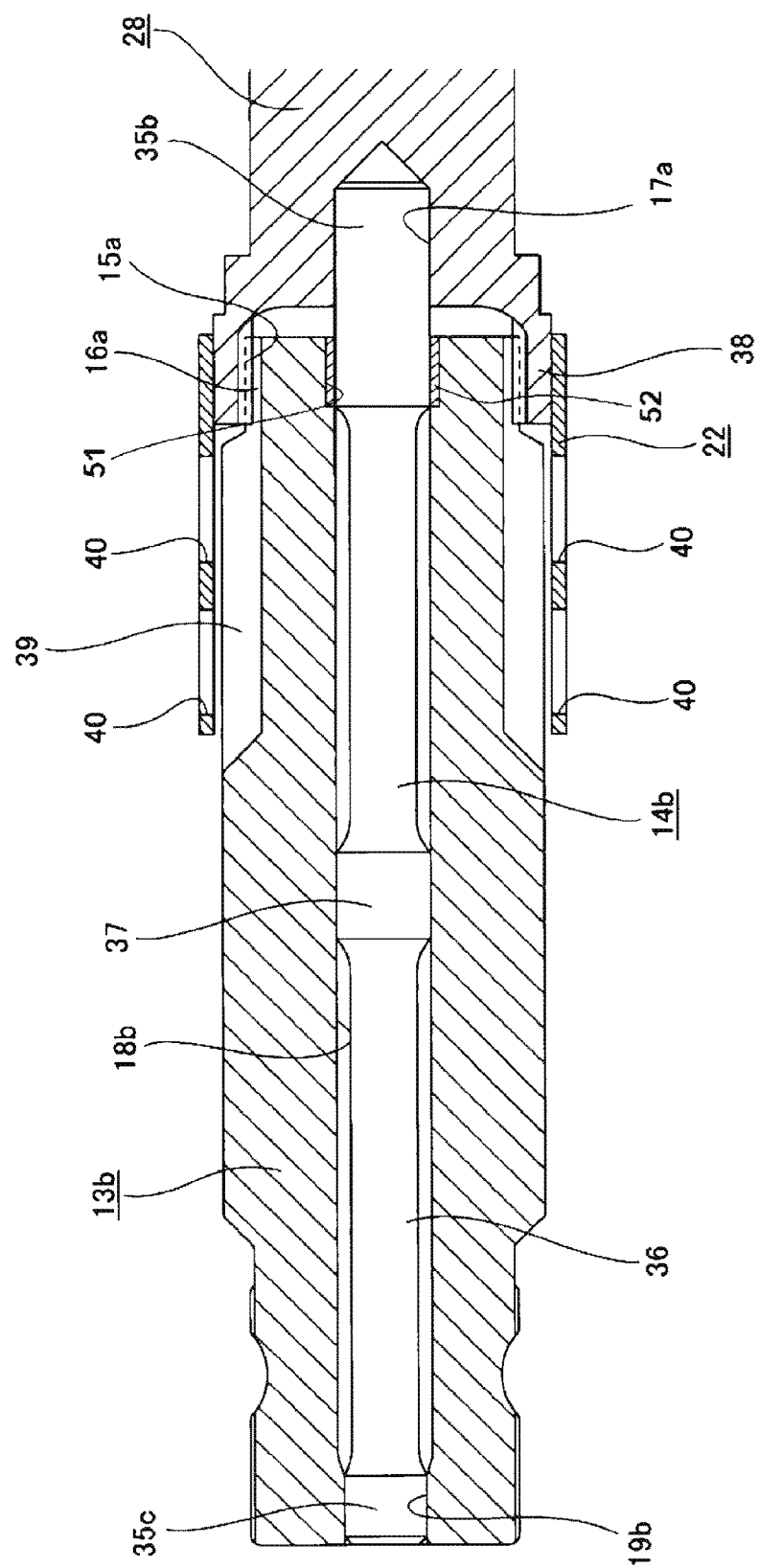
FIG. 15 is a similar view to FIG. 8, showing a fourth embodiment of the present invention.

FIG. 15 shows a fourth embodiment of the present invention. The fourth embodiment is different from the second embodiment, in that a tip portion of the center hole 18b of the output shaft 13b at a side of the lower shaft 28 is formed with a slide bush insertion hole 51 and a slide bush 52 is inserted (press-fitted) therein. The slide bush 52 is provided at the tip portion of the output shaft 13b at a side of the lower shaft 28, so that following effects are achieved. That is, if the slide bush 52 is not provided at the tip portion of the output shaft 13b at a side of the lower shaft 28, the female stopper portion 15a of the lower shaft 28 may be diametrically distorted with respect to the male stopper portion 16a of the output shaft 13b due to the rotation of the lower shaft 28 accompanied by the rotation of the steering wheel 4. As a result, the detection precision of the torque sensor may be influenced.

However, when the slide bush 52 is inserted into the tip portion of the output shaft 13b at a side of the lower shaft 28 and the coupling shaft portion 35b of the torsion bar 14b is supported by the slide bush 52, like the fourth embodiment, it is possible to prevent the situation where the female stopper portion 15a of the lower shaft 28 is diametrically distorted with respect to the male stopper portion 16a of the output shaft 13b. As a result, it is possible to remove the influence on the detection precision of the torque sensor.

In the meantime, regarding the torsion bar 14b used in the fourth embodiment, the coupling shaft portion 35b configured to couple with the coupling hole 17a of the lower shaft 28 and having a diameter greater than the spring shaft portion 36 is formed to be axially long to be in contact with the slide bush 52.

Since the other configurations and operations are the same as the second embodiment, the overlapping illustrations and descriptions are omitted.

[Fifth Embodiment]

Figure 16:
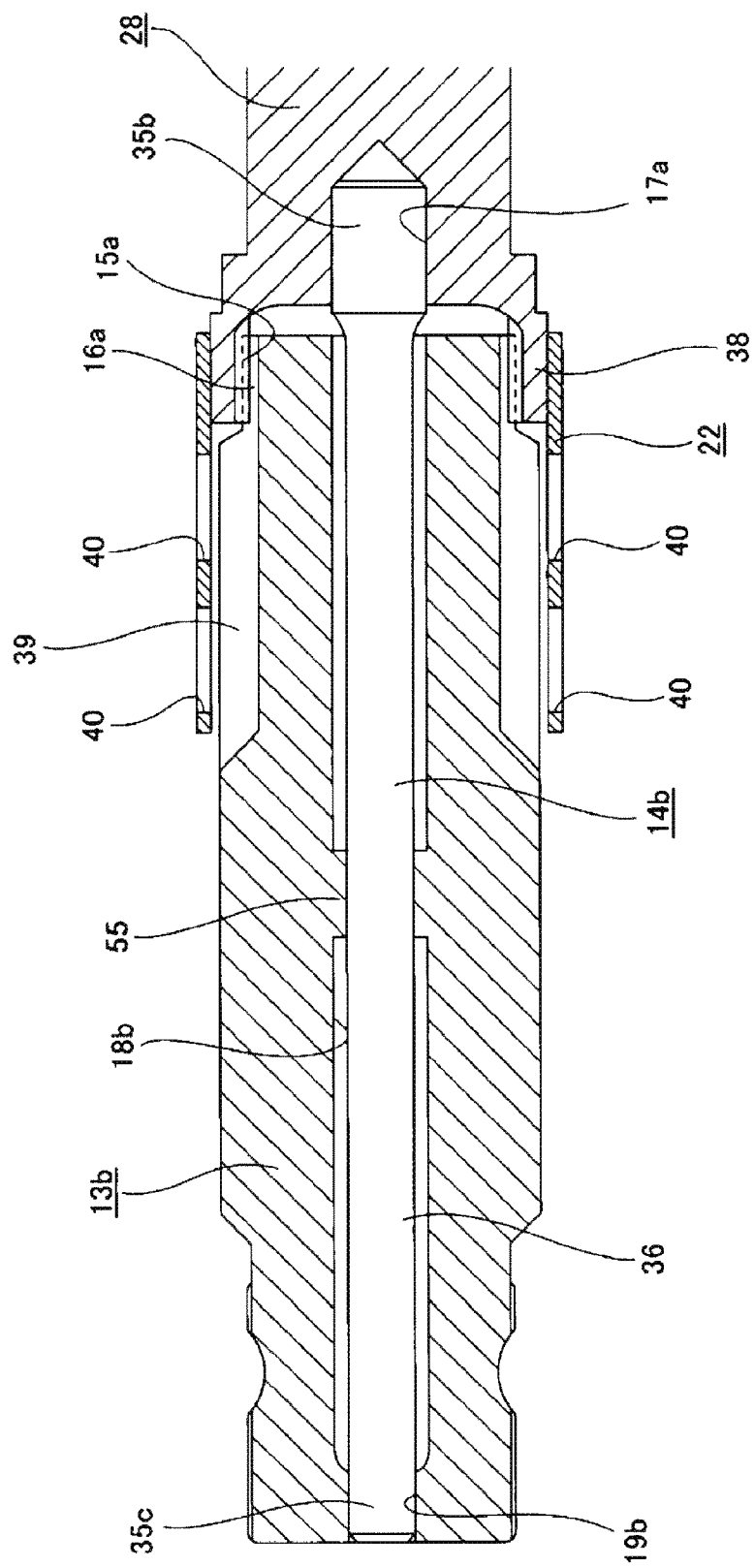
FIG. 16 is a similar view to FIG. 8, showing a fifth embodiment of the present invention.

FIG. 16 shows a fifth embodiment of the present invention. The fifth embodiment is different from the second embodiment, in that instead of providing the large diameter portion 37 at the axially center portion of the spring shaft portion 36, a small diameter portion 55, as the diametrical extension portion, is provided at a portion including the axially center portion of the center hole 18b of the output shaft 13b, and an inner surface of the small diameter portion 55 is in contact with or is to contact the outer peripheral surface of the spring shaft portion 36.

That is, at a state where the torsion bar 14b is arranged at the inner diameter side of the output shaft 13b, a cylindrical inner peripheral surface of the small diameter portion 55 is positioned close to the cylindrical outer peripheral surface of the spring shaft portion 36 (closer to the cylindrical outer peripheral surface of the spring shaft portion than inner peripheral surfaces of parts adjacent to both axial sides of the small diameter portion 55) or is in contact with the cylindrical outer peripheral surface of the spring shaft portion without an interference.

It is possible to prevent the spring shaft portion 36 of the torsion bar 14b from buckling by the configuration where the small diameter portion 55 is provided in the center hole 18b of the output shaft 13b, which is the same as the second embodiment.

In the fifth embodiment, when press-fitting the coupling shaft portion 35c into the coupling hole 19b, the axially high compressive force is applied to the spring shaft portion 36. However, even though the spring shaft portion 36 tends to buckle due to the axially high compressive force, the inner surface of the small diameter portion 55 provided in the center hole 18b of the output shaft 13b is in contact with or is to contact the outer peripheral surface of the spring shaft portion 36, so that the buckling deformation is prevented.

Since the other configurations and operations are the same as the second embodiment, the overlapping illustrations and descriptions are omitted.

[Sixth Embodiment]

Figure 17:
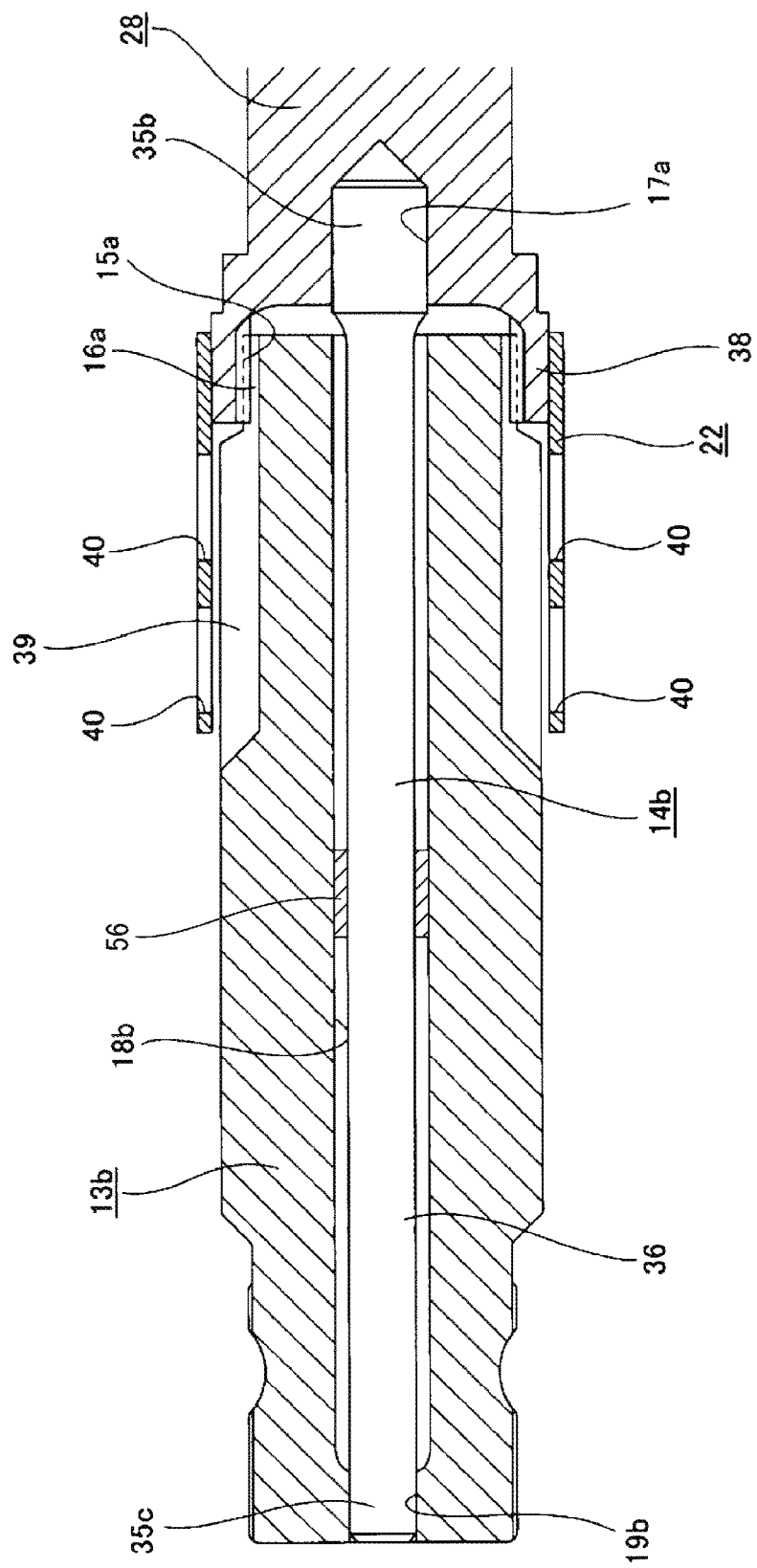
FIG. 17 is a similar view to FIG. 8, showing a sixth embodiment of the present invention.

FIG. 17 shows a sixth embodiment of the present invention. The sixth embodiment is different from the second or fifth embodiment, in that instead of providing the large diameter portion 37 on the axially center portion of the spring shaft portion 36, a bush 56 is provided as the diametrical extension portion, or instead of providing the small diameter portion 55 on the axially center portion of the center hole 18b of the output shaft 13b, a bush 56 is provided as the diametrical extension portion.

When the bush 56 is provided on the axially center portion of the spring shaft portion 36 and the bush 56 is configured to function as the large diameter portion, the bush 56 is press-fitted from the coupling shaft portion 35c-side of the torsion bar 14b and is fixed to the axially center portion of the spring shaft portion 36.

The bush 56 is made of metal or resin, and an inner diameter size thereof is slightly smaller than the outer diameter size of the spring shaft portion 36. In this case, it is possible to easily perform the press-fitting operation by forming a slit on the bush 56 over an entire axial length thereof.

When the bush 56 is provided on the axially center portion of the center hole 18b of the output shaft 13b and the bush 56 is configured to function as the small diameter portion, the bush 56 is press-fitted from a side of the center hole 18b of the output shaft 13b, at which the coupling hole 19b is not provided, and is fixed to the axially center portion of the center hole 18b.

The configuration where the outer peripheral surface of the bush 56 is in contact with or to contact the inner peripheral surface of the center hole 18b of the output shaft 13b or the inner peripheral surface of the bush 56 is in contact with or to contact the outer peripheral surface of the spring shaft portion 36 is the same as the large diameter portion 37 of the second embodiment and the small diameter portion 55 of the fifth embodiment.

It is possible to prevent the spring shaft portion 36 of the torsion bar 14b from buckling by the configuration where the bush 56 is provided on the axially center portion of the spring shaft portion 36 or the bush 56 is provided on the axially center portion of the center hole 18b of the output shaft 13b, which is the same as the second or fifth embodiment.

Since the other configurations and operations are the same as the second or fifth embodiment, the overlapping illustrations and descriptions are omitted.

In the meantime, only one bush 56 is provided in the sixth embodiment. However, two or more bushes may be provided.

[Seventh Embodiment]

Figure 18:
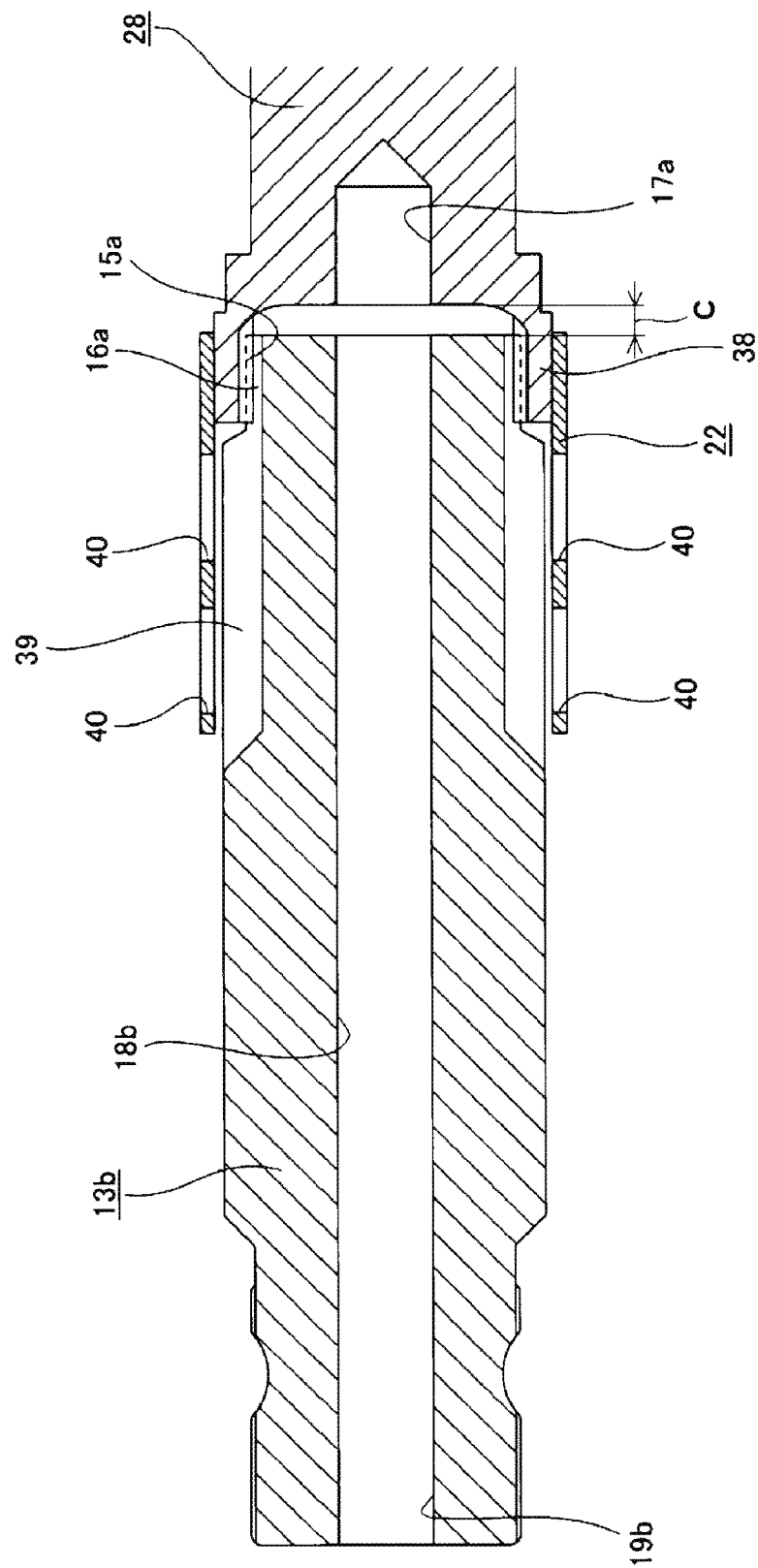
FIG. 18 is a sectional view showing a process of assembling some components such as an input shaft, an output shaft, and the like in a structure of a seventh embodiment of the present invention.
Figure 19:
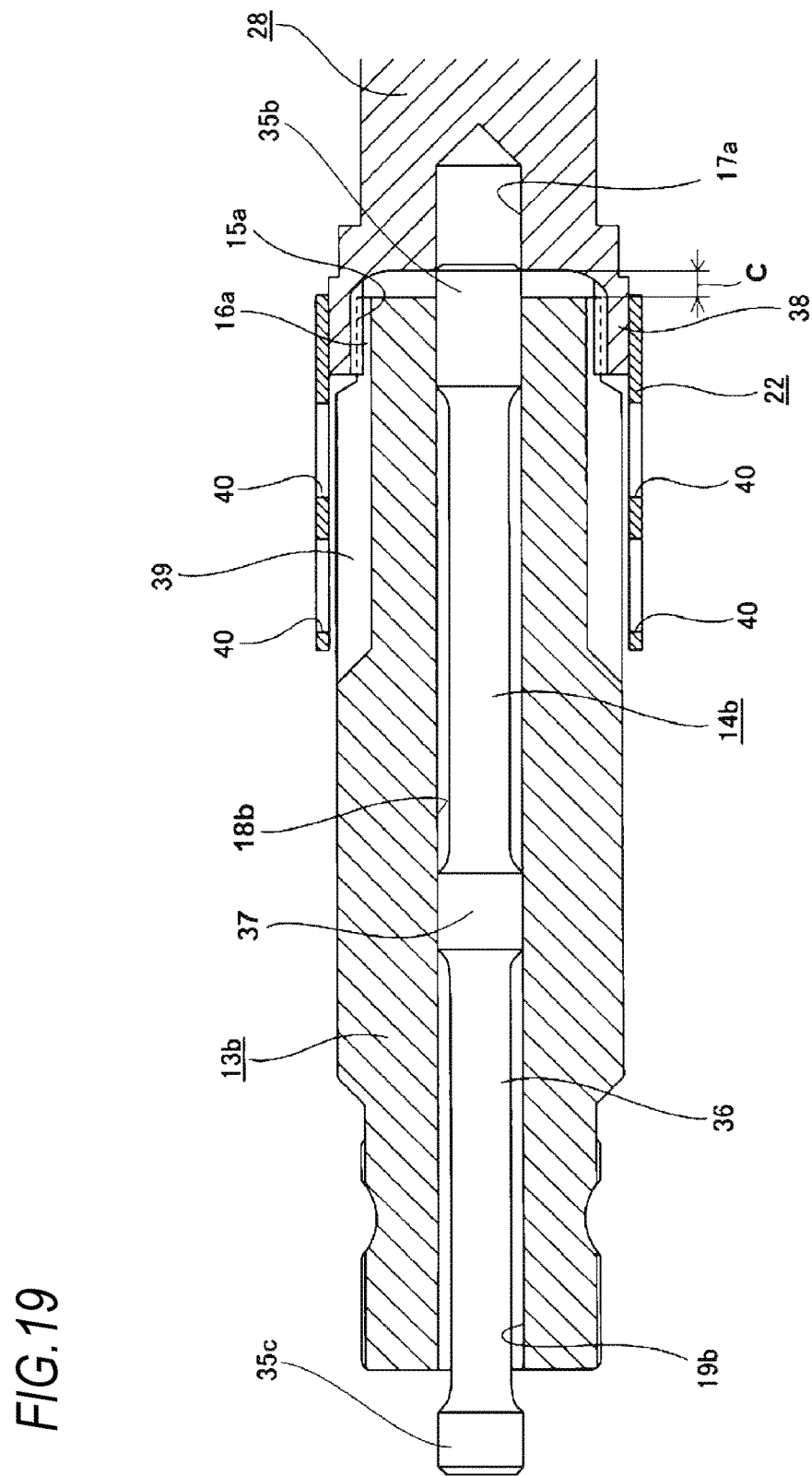
FIG. 19 is a sectional view showing a stage of the assembling subsequent to FIG. 18.
Figure 20:
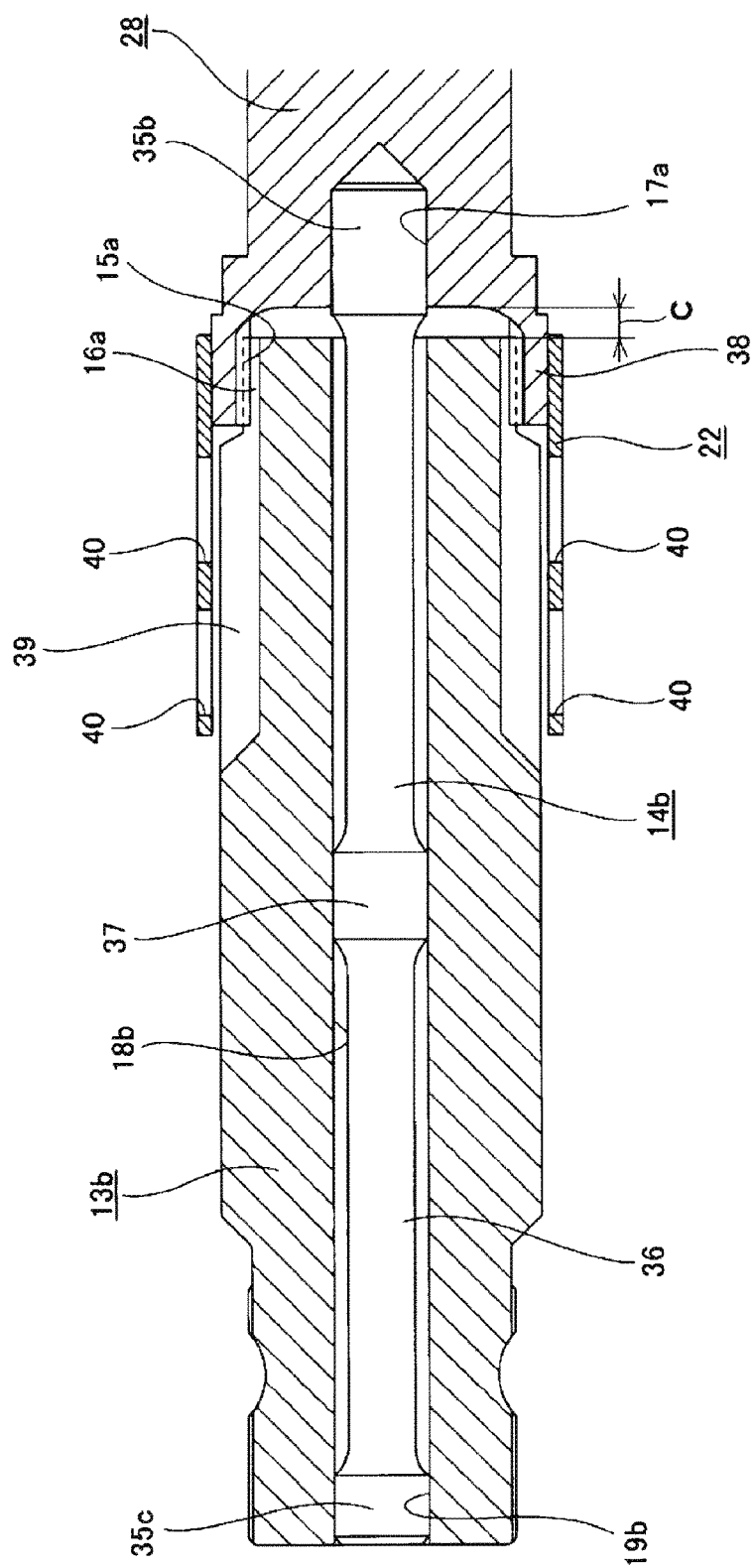
FIG. 20 is a sectional view showing a state after completion of the assembling.

A seventh embodiment of the present invention is described with reference to FIGS. 18 to 20. In FIGS. 18 to 20, the left side is a front side and the right side is a rear side.

In the seventh embodiment, as shown in FIGS. 18 to 20, an order of assembling the lower shaft 28, the output shaft 13b and the torsion bar 14b is different from the second embodiment.

That is, according to the seventh embodiment, as shown in FIG. 18, the base end portion of the torque detection sleeve 22 is first fitted and fixed to the outer side of the cylindrical portion 38 of the lower shaft 28. Then, the rear end portion of the male stopper portion 16a provided on the outer peripheral surface of the rear end portion of the output shaft 13b and the front end portion of the female stopper portion 15a provided on the inner peripheral surface of the cylindrical portion 38 of the lower shaft 28 are engaged with each other with a circumferential gap therebetween. At the engagement of the male stopper portion 16a and the female stopper portion 15a, the lower shaft 28 and the output shaft 13b are respectively fixed by a jig (not shown).

Then, the engaged state between the male and female stopper portions 16a, 15a is made to be neutral in the circumferential direction, so that the positional relation between the lower shaft 28 and the output shaft 13b in the rotating direction is adjusted to the center position of the predetermined angle range.

In this case, a distance from the rear end portion of the output shaft 13b to the opening of the coupling hole 17a is kept to be the same as a distance C between the rear end portion of the output shaft 13b and the opening of the coupling hole 17a, which is formed when the torsion bar 14b is press-fitted into the lower shaft 28 and the output shaft 13b, as shown in FIG. 20.

Then, as shown in FIG. 19, at the state where the lower shaft 28 and the output shaft 13b are engaged and fixed to the jig (not shown), the torsion bar 14b is inserted into the center hole 18b of the torsion bar 14b from the front end-side of the output shaft 13b, and the coupling shaft portion 35b of the torsion bar 14b is engaged with the opening of the coupling hole 17a of the lower shaft 28.

Then, at this state, as shown in order of FIG. 19 and FIG. 20, the coupling shaft portion 35b is press-fitted into the coupling hole 17a and the coupling shaft portion 35c is press-fitted into the coupling hole 19b. Thereby, the coupling shaft portion 35b is coupled to the lower shaft 28 and the coupling shaft portion 35c is coupled to the output shaft 13b, respectively, such that torque can be transmitted.

According to the seventh embodiment configured as described above, as shown with the order of FIG. 19 and FIG. 20, when press-fitting the coupling shaft portion 35b, which is an axial end portion of the torsion bar 14b, into the coupling hole 17a, it is possible to prevent the spring shaft portion 36 of the torsion bar 14b from buckling. That is, according to the seventh embodiment, when press-fitting the coupling shaft portion 35b into the coupling hole 17a, the axially high compressive force is applied to the spring shaft portion 36. However, even though the spring shaft portion 36 tends to buckle due to the axially high compressive force, the outer peripheral surface of the large diameter portion 37 provided at the axially center portion of the spring shaft portion 36 is in contact with or is to contact the inner peripheral surface of the output shaft 13a, so that the buckling deformation is prevented.

Also, according to the seventh embodiment, at the assembling, as shown in FIG. 18, since it is possible to engage the axial end portions of the male and female stopper portion 16a, 15a each other before press-fitting the coupling shaft portion 35c into the coupling hole 19b, the positional relation between the lower shaft 28 and the output shaft 13b in the rotating direction can be easily adjusted to the center position of the predetermined angle range. Therefore, it is possible to easily realize the normal assembled state.

Since the other configurations and operations are the same as the second embodiment, the overlapping illustrations and descriptions are omitted.

INDUSTRIAL APPLICABILITY

The present invention can also be applied to a structure where the first shaft is configured as the input shaft to which the steering force from the steering wheel is to be applied, like the structure disclosed in Patent Document 2, for example.

Also, the present invention can be applied to a structure where an assist mechanism including the first and second shafts and the torsion bar is provided for the steering gear unit.

Also, when implementing the present invention, a configuration can also be adopted in which a cylindrical bush made of a low frictional material such as synthetic resin is fitted and fixed to an inner side of an end portion of the inner peripheral surface of the first shaft at side of the second shaft in the axial direction, and the outer peripheral surface of the spring shaft portion of the torsion bar is slidably supported by the inner peripheral surface of the bush. By this configuration, it is possible to easily prevent the first shaft and the torsion bar from being inclined.

The present invention is based on Japanese Patent Application Nos. 2014-043250 filed on Mar. 5, 2014, 2014-148079 filed on Jul. 18, 2014, 2014-160002 filed on Aug. 6, 2014 and 2014-205407 filed on Oct. 6, 2014, the contents of which are herein incorporated by reference.

DESCRIPTION OF REFERENCE NUMERALS

1: vehicle body
2, 2a: steering column
3, 3a: steering shaft
4: steering wheel
5a, 5b: universal joint
6: intermediate shaft
7: steering gear unit
8: input shaft
9: tie-rod
10: electric motor
11, 11a: housing
12: input shaft
13, 13a, 13b: output shaft
14, 14a, 14b, 14c: torsion bar
15, 15a: female stopper portion
16, 16a: male stopper portion
17, 17a: coupling hole
18, 18a, 18b: center hole
19, 19a, 19b, 19c: coupling hole
20, 20a: through hole
21, 21a: pin
22: torque detection sleeve
23: torque detection coil unit
24: worm-type decelerator
25: inner column
26: outer column
27: support bracket
28: lower shaft
29: upper shaft
30: cover body
31: main body
32: bolt
33: ball bearing
34: ball bearing
35a, 35b, 35c, 35d: coupling shaft portion
36, 36a, 36b: spring shaft portion
37, 37a: large diameter portion (diametrical extension portion)
38: cylindrical portion
39: torque detection concavo-convex portion
40: window hole
41: coil
42: worm wheel
43: guide shaft portion
44, 44a: guide hole
55: small diameter portion (diametrical extension portion)
56: bush (diametrical extension portion)

What is claimed is:

1. A method of assembling an wherein the electric power steering device comprises:
a hollow first shaft;
a second shaft which is arranged coaxially with the first shaft; and
a torsion bar which includes a pair of coupling shaft portions provided at both axial end portions thereof and a spring shaft portion provided between the pair of coupling shaft portions, and which is arranged at an inner diameter side of the first shaft, wherein one of the coupling shaft portions is coupled to the first shaft and the other of the coupling shaft portions is coupled to the second shaft, respectively, such that torque can be transmitted,
wherein at least one of the coupling shaft portions is press-fitted into at least one of a first coupling hole and a second coupling hole formed in a counter-shaft which is one of the first and second shafts, to which the one of the coupling shaft portions is to be coupled,
wherein a steering force from a steering wheel is applied to either one of the first and second shafts,
wherein one of an outer peripheral surface of an axially intermediate portion of the spring shaft portion and an inner peripheral surface of an axially intermediate portion of the first shaft is provided with a diametrical extension portion, which is configured by any one of the spring shaft portion and the first shaft, which extends in a diametrical direction more than portions adjacent to both axial sides thereof,
wherein the diametrical extension portion is in contact with or positioned closer to an opposite surface of the other of the outer peripheral surface of the axially intermediate portion of the spring shaft portion and the inner peripheral surface of the axially intermediate portion of the first shaft than the portions adjacent to both axial sides of the diametrical extension portion,
wherein a first stopper portion provided on one axial portion of the first shaft and a second stopper portion provided on one axial portion of the second shaft are engaged with each other with a circumferential gap therebetween such that relative rotations of the first and second shafts are restrained within a predetermined angle range,
wherein the one of the coupling shaft portions is press-fitted into the first coupling hole formed in the first shaft,
wherein the other of the coupling shaft portions is press-fitted into the second coupling hole formed in the second shaft and abuts on a bottom end portion of the second coupling hole, and
wherein there is a size relation that at assembling, at a state where the other of the coupling shaft portions is press-fitted into the second coupling hole formed in the second shaft and abuts on the bottom end portion of the second coupling hole, after the torsion bar is inserted into the inner diameter side of the first shaft and before press-fitting the one of the coupling shaft portion into the first coupling hole formed in the first shaft, at least portions of the first and second stopper portions can be engaged with each other with the circumferential gap therebetween,
the method comprising:
inserting the torsion bar into the inner diameter side of the first shaft at the state where the other of the coupling shaft portions is press-fitted into the second coupling hole formed in the second shaft to abut on the bottom end portion of the second coupling hole;
engaging at least the portions of the first and second stopper portions to each other with the circumferential gap therebetween; and
press-fitting the one of the coupling shaft portions into the first coupling hole formed in the first shaft at a state where a positional relation between the first and second shafts in a rotating direction is adjusted to a center position of the predetermined angle range.

2. The method according to claim 1,
wherein the diametrical extension portion includes a large diameter portion configured by the axially intermediate portion of the spring shaft portion and having a larger outer diameter size than the portions adjacent to both axial sides thereof, and an outer peripheral surface of the large diameter portion is in contact with or positioned closer to an inner peripheral surface of the first shaft than outer peripheral surfaces of portions adjacent to both axial sides of the large diameter portion.

3. The method according to claim 2,
wherein the large diameter portion is provided on a portion including an axially center portion of the spring shaft portion.

4. The method according to claim 2,
wherein the large diameter portion is provided at a plurality of axial positions of the spring shaft portion.

5. The method according to claim 1,
wherein the diametrical extension portion includes a small diameter portion configured by the axially intermediate portion of the first shaft and having a smaller outer diameter size than the portions adjacent to both axial sides thereof, and an inner peripheral surface of the small diameter portion is in contact with or positioned closer to an outer peripheral surface of the spring shaft portion than inner peripheral surfaces of portions adjacent to both axial sides of the small diameter portion.

6. The method according to claim 5,
wherein the small diameter portion is provided on a portion including an axially center portion of the spring shaft portion.

7. The method according to claim 5,
wherein the small diameter portion is provided at a plurality of axial positions of the spring shaft portion.

8. The method according to claim 1,
wherein the diametrical extension portion includes a bush provided on the axially intermediate portion of the spring shaft portion, and an outer peripheral surface of the bush is in contact with or positioned closer to the inner peripheral surface of the first shaft than outer peripheral surfaces of portions adjacent to both axial sides of the bush.

9. The method according to claim 1,
wherein the diametrical extension portion includes a bush provided on the axially intermediate portion of an inner diameter portion of the first shaft, and an inner peripheral surface of the bush is in contact with or positioned closer to the outer peripheral surface of the spring shaft portion than inner peripheral surfaces of portions adjacent to both axial sides of the bush.

10. The electric power steering deice method according to claim 1,
wherein the one of the coupling shaft portions is coupled to the first shaft such that torque can be transmitted and axial relative displacement is prevented, and
wherein there is the size relation that at assembling, after the torsion bar is arranged at the inner diameter side of the first shaft and the one of the coupling shaft portions is coupled to the first shaft such that torque can be transmitted and axial relative displacement is prevented and before press-fitting the other of the coupling shaft portion into the second coupling hole formed in the second shaft, at least the portions of the first and second stopper portions can be engaged with each other with the circumferential gap therebetween.

11. The method according to claim 10, the method further comprising:
arranging the torsion bar at the inner diameter side of the first shaft and coupling the one of the coupling shaft portions to the first shaft such that torque can be transmitted and axial relative displacement is prevented; and
press-fitting the other of the coupling shaft portions into the second coupling hole formed in the second shaft at the state where the positional relation between the first and second shafts in the rotating direction is adjusted to the center position of the predetermined angle range.

12. The method according to claim 1,
wherein there is the size relation that at assembling, before press-fitting of the coupling shaft portions such that while press-fitting the other of the coupling shaft portions into the second coupling hole formed in the second shaft to abut on the bottom end portion of the second coupling hole and the one of the coupling shaft portions is press-fitted into the first coupling hole formed in the first shaft after the torsion bar is inserted into the inner diameter side of the first shaft, at least the portions of the first and second stopper portions can be engaged with each other with the circumferential gap therebetween.

13. The method according to claim 12, the method comprising:
inserting the torsion bar into the inner diameter side of the first shaft at the state where the positional relation between the first and second shafts in the rotating direction is adjusted to the center position of the predetermined angle range; and
press-fitting the other of the coupling shaft portions into the second coupling hole formed in the second shaft to abut on the bottom end portion of the second coupling hole.

14. The method according to claim 1,
wherein the first shaft has a center hole, a tip portion of the center hole at a side of the second shaft is formed with a slide bush insertion hole, and a slide bush is inserted into the slide bush insertion hole.

15. The method according to claim 14,
wherein the other of the coupling shaft portions coupled with the second coupling hole formed in the second shaft is formed to be axially long to contact the slide bush.

* * * * *